US010297890B2

(12) United States Patent
Mulder et al.

(10) Patent No.: US 10,297,890 B2
(45) Date of Patent: May 21, 2019

(54) HYBRID BATTERY AND ELECTROLYSER

(71) Applicant: TECHNISCHE UNIVERSITEIT DELFT, CN Delft (NL)

(72) Inventors: Fokko Marten Mulder, AA Delft (NL); Bernhard Weninger, AA Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 16 days.

(21) Appl. No.: 15/570,865

(22) PCT Filed: Apr. 28, 2016

(86) PCT No.: PCT/NL2016/050304
§ 371 (c)(1),
(2) Date: Oct. 31, 2017

(87) PCT Pub. No.: WO2016/178564
PCT Pub. Date: Nov. 10, 2016

(65) Prior Publication Data
US 2018/0138569 A1    May 17, 2018

(30) Foreign Application Priority Data

May 1, 2015   (NL) ..................................... 2014744
Dec. 4, 2015  (NL) ..................................... 2015907

(51) Int. Cl.
*C25B 1/10*     (2006.01)
*C25B 9/08*     (2006.01)
(Continued)

(52) U.S. Cl.
CPC ............... *H01M 16/00* (2013.01); *C25B 1/10* (2013.01); *C25B 9/08* (2013.01); *C25B 11/04* (2013.01);
(Continued)

(58) Field of Classification Search
CPC ......... H01M 16/00; H01M 4/32; H01M 4/248
See application file for complete search history.

(56) References Cited

U.S. PATENT DOCUMENTS 4,180,623 A * 12/1979 Adams .................. H01M 10/36
429/107
4,465,570 A   8/1984 Oda et al.
(Continued)

FOREIGN PATENT DOCUMENTS

| CN | 102610874 | 7/2012 |
| JP | 2001095164 | 4/2001 |
| WO | 2015/042573 | 3/2015 |

OTHER PUBLICATIONS

Cook et al., "Solar Energy Supply and Storage for the Legacy and Nonlegacy Worlds," Chem. Rev. 2010, 110, pp. 6474-6502.

*Primary Examiner* — Matthew J Merkling
(74) *Attorney, Agent, or Firm* — Occhiuti & Rohlicek LLP

(57) ABSTRACT

The invention provides a method of storing varying or intermittent electrical energy and one or more of hydrogen ($H_2$) and oxygen ($O_2$) with an energy apparatus, the method comprising: providing the first cell aqueous liquid, the second cell aqueous liquid, and electrical power from an external power source to the functional unit thereby providing an electrically charged functional battery unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V.

19 Claims, 16 Drawing Sheets

(51) Int. Cl.
*H01M 2/36* (2006.01)
*H01M 4/24* (2006.01)
*H01M 4/32* (2006.01)
*C25B 11/04* (2006.01)
*H01M 10/30* (2006.01)
*H01M 10/42* (2006.01)
*H01M 10/44* (2006.01)
*H01M 10/46* (2006.01)
*H01M 16/00* (2006.01)

(52) U.S. Cl.
CPC ............. *H01M 2/36* (2013.01); *H01M 4/248* (2013.01); *H01M 4/32* (2013.01); *H01M 10/30* (2013.01); *H01M 10/44* (2013.01); *H01M 10/465* (2013.01); *H01M 2010/4271* (2013.01); *H01M 2300/0014* (2013.01); *Y02E 60/124* (2013.01); *Y02E 60/366* (2013.01)

(56) References Cited

U.S. PATENT DOCUMENTS

| | | | |
|---|---|---|---|
| 4,670,114 A | 6/1987 | Beer et al. | |
| 9,666,919 B1* | 5/2017 | Brown | H01M 12/06 |
| 2005/0202290 A1* | 9/2005 | Merzougui | H01M 4/242 |
| | | | 429/9 |
| 2013/0149615 A1* | 6/2013 | Narayan | H01M 4/12 |
| | | | 429/405 |
| 2014/0217985 A1 | 8/2014 | Gifford et al. | |
| 2015/0048777 A1 | 2/2015 | Goldstein | |

\* cited by examiner

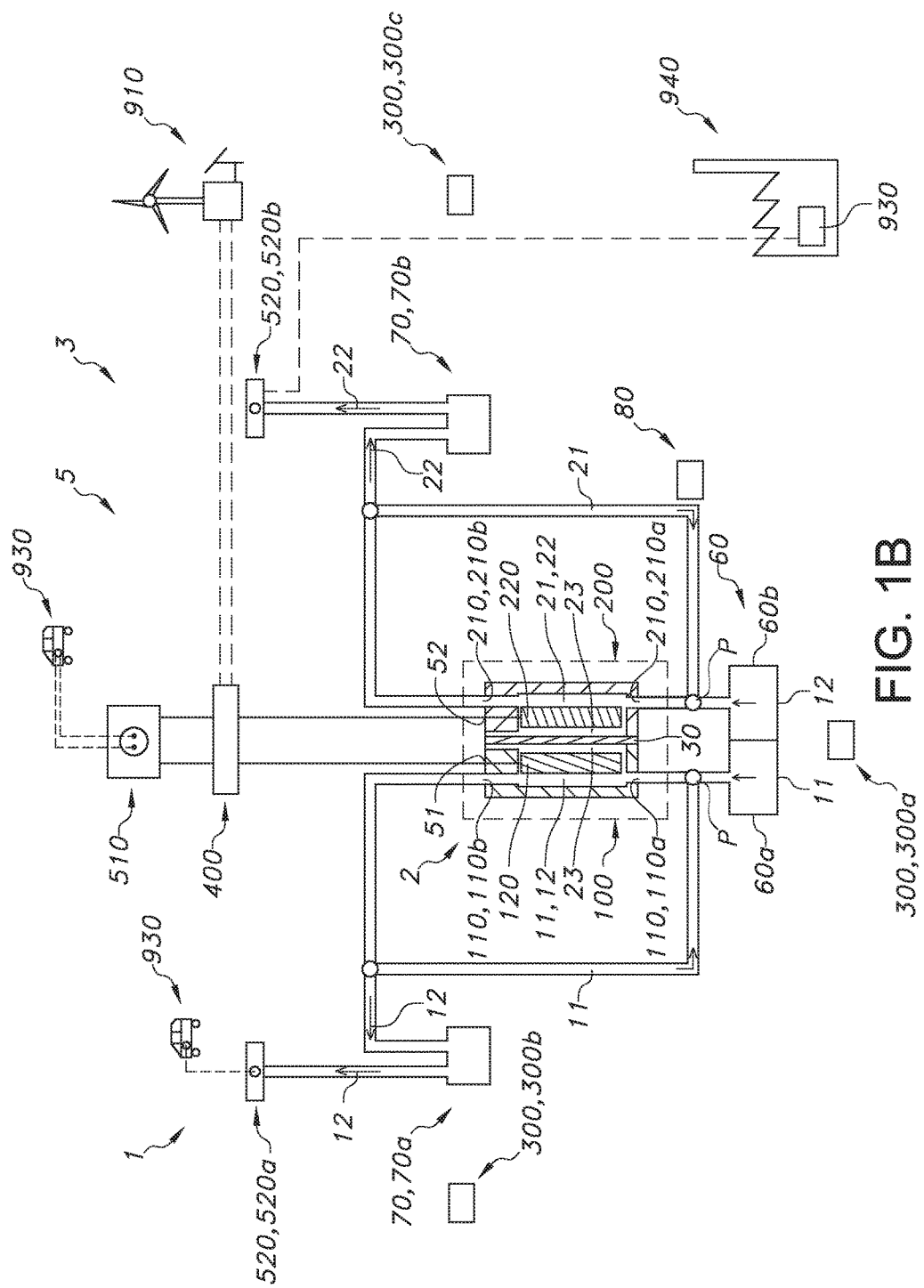

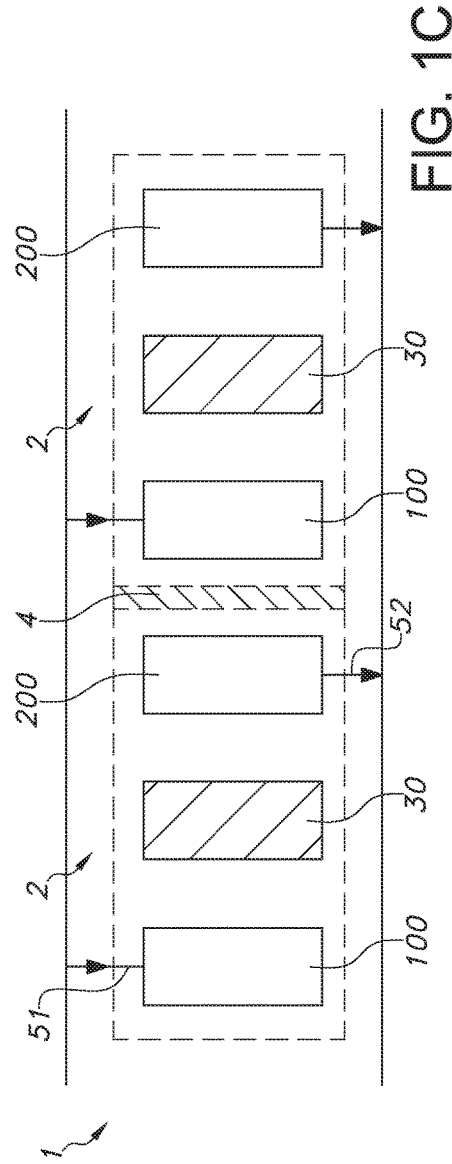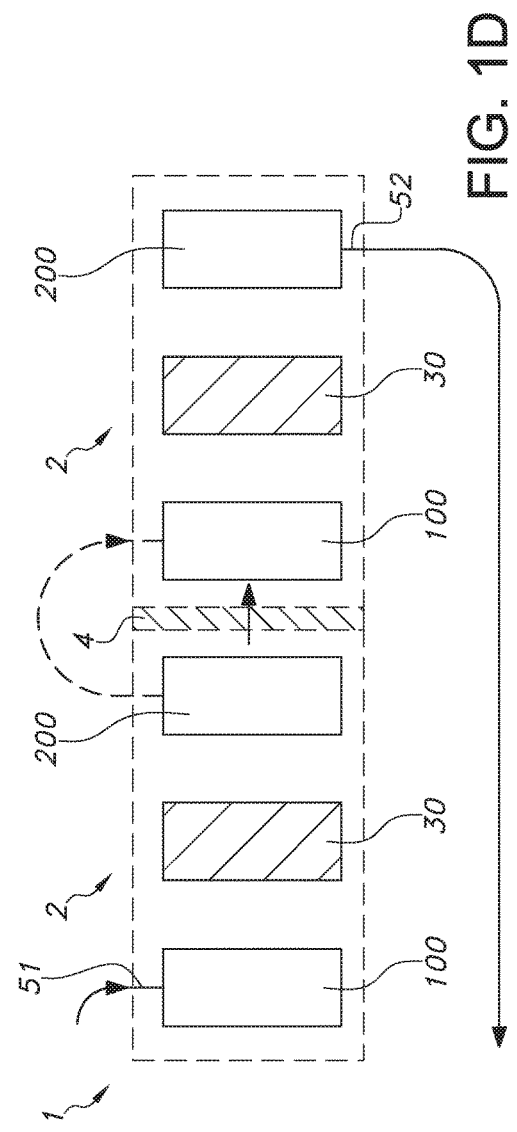

HYBRID BATTERY AND ELECTROLYSER

CROSS REFERENCE TO RELATED APPLICATIONS

This application is a National Phase under 35 USC 371 of International Application No. PCT/NL2016/050304, filed on Apr. 28, 2016, which claims priority to Netherlands Application No. 2014744 filed on May 1, 2015, and Netherlands Application No. 2015907 filed Dec. 4, 2015, the contents of which are hereby incorporated by reference in their entirety.

FIELD OF THE INVENTION

The invention relates to an apparatus for providing electrical energy and/or an energy carrier (such as $H_2$). The invention also relates to an energy system comprising such apparatus. Further, the invention relates to a method for providing electrical energy and/or an energy carrier (such as $H_2$). Yet, the invention also relates to the use of the apparatus and/or the energy system.

BACKGROUND OF THE INVENTION

Electrolysers are known in the art. US2015069836, for instance, describes a method for controlling a feed arrangement having a wind energy installation for feeding electrical power into an electrical supply system, comprising the following steps: generating electrical power using the wind energy installation from wind, feeding a first proportion of the generated electrical power into the electrical supply system, supplying a second proportion of the generated electrical power to an electrical consumer for consuming the supplied second proportion of the generated electrical power, and wherein depending on at least one monitored system state and/or depending on the prevailing wind, the second proportion of the generated electrical power which is supplied to the consumer is reduced wholly or partially and the first proportion of the electrical power fed into the electrical supply system is increased correspondingly, and to a corresponding feed arrangement.

SUMMARY OF THE INVENTION

To accommodate increasing amounts of renewable electricity from wind and solar power, grid scale electricity storage on diurnal and seasonal scales is required. The realisation of affordable solutions for different types of storage suffer from life time issues, low energy efficiencies, conversion losses, and/or too high cost when taking into account the limited full operational time throughout the year due to the varying renewable electricity supply.

Hence, it is an aspect of the invention to provide an alternative energy apparatus, which preferably further at least partly obviates one or more of above-described drawbacks. Yet, it is also an aspect of the invention to provide an alternative energy system, comprising such energy apparatus, which preferably further at least partly obviates one or more of above-described drawbacks. Further, it is also an aspect of the invention to provide an alternative method for storing and regenerating electricity and/or an energy carrier, which preferably further at least partly obviates one or more of above-described drawbacks.

The diurnal electricity storage would be most energy efficient in batteries, while seasonal storage scales require the conversion to artificial fuels based on abundant elements. These two directions have always been treated as separate or even competing solutions.

Here we show that the Ni—Fe battery can be modified to operate as highly efficient integrated battery-electrolyser. We found that in addition to the full capacity of the battery an equal or larger amount of charge can be used to produce hydrogen at an overall energy efficiency of ≥81%. The charged battery electrodes consisting of nanostructured NiOOH and reduced Fe act as efficient oxygen and hydrogen evolution catalysts respectively, generating hydrogen when the battery is full. In this way the operational time of the device is extended beyond the charge time of the battery and can thus still perform usefull energy storage in the form of gas production. When the renewable produced electricity production decreases the battery is charged and available to discharge and supply electricity. Full term operation of the device even with varying electricity supply thus becomes possible, in contrast with a singular battery or a singular electrolyser that are not integrated in one device. Furthermore, the heat dissipated in overpotentials of the battery is directly used in the generation of hydrogen, especially when thermal insulation and management is applied to reduce the heat loss to the environment. Note in this respect that hydrogen and oxygen production by electrolytic water splitting requires the supply of heat. The thermal insulation and thermal management system may include thermal insulation around the integrated battery and electrolyser as well as optionally cooling. Such thermal insulation and management enables heating by the currents that run up to e.g. 60° C. during periods of charge and hydrogen evolution and may limit the temperature to remain below 60° C. Hence, especially the energy apparatus may further include a thermal management system configured to maintain the functional unit (see also below) at a temperature selected from the range of 5-95° C., especially 10-75° C., such as in the range of 15-70° C., such as at maximum 60° C.

Our results demonstrate an integrated battery and electrolyser based on the abundant elements Fe, Ni and a KOH (with optionally LiOH and NaOH) water based electrolyte that addresses both diurnal and seasonal electricity storage. This may provide a robust grid scale energy storage solution in a low cost intrinsically flexible device that has close to full time applicability: as daytime unlimited switchable power storage, as night time electricity source.

The Ni—Fe battery was introduced by Jungner and Edison. At the negative electrode $Fe(OH)_2$ is present which is reduced to Fe upon charge: $Fe(OH)_2+2e^-\rightarrow Fe+2OH^-$ (−0.877V vs SHE) while at the positive electrode $Ni(OH)_2$ is present that upon charge releases a proton: $Ni(OH)_2+OH^- \rightarrow NiOOH+H_2O+e^-$ (+0.49V vs SHE). The open circuit potential of the battery is 1.37 V, which is higher than the minimum potential required to split water from the 6M KOH electrolyte. For this reason, there is under normal operation already a risk to split water in hydrogen and oxygen, leading to energy loss, and a slow loss of electrolyte. At the positive electrode then the reaction $4OH^-\rightarrow O_2+2H_2O+4e^-$ can take place (+0.40 vs. SHE), while at the negative electrode $2H_2O+2e^-\rightarrow H_2+2OH^-$ can take place (−0.83 vs. SHE). Also the reaction $Fe+2H_2O\rightarrow Fe(OH)_2+H_2$ is known to lead to spontaneous self discharge. The $Ni(OH)_2$ and $Fe(OH)_2$ are nanostructured for enabling faster (dis-)charge rates. The theoretical capacity for storing $H^+$ in $Ni(OH)_2$ in the reaction above corresponds to 289 mAh/g. The theoretical capacity for storing $OH^-$ in $Fe(OH)_2$ corresponds to 596 mAh/g.

Alkaline electrolysers may be used for the generation of hydrogen and oxygen at a typical efficiency of 71% (HHV (higher heating value) of produced hydrogen divided by the applied electrical energy). The main active components are a Ni metal based positive electrode and a Ni (or Ni coated Fe) negative electrode which is separated by a diaphragm or separator which separates hydrogen from oxygen while transmitting the ions in the alkaline electrolyte. The metal electrodes have an increased surface area from its porous structure (Raney nickel) for higher gas production rates. In addition precious metals like Pt or Pt—Ru can be incorporated in the negative electrode to decrease the required overpotentials for hydrogen production from 200 mV to 50 mV at currents of 0.5 A/cm$^2$ electrode surface, for instance at 80° C. The diaphragm can be a ceramic composite, while the electrolyte is again a strongly alkaline, especially KOH, solution. The efficiency of the alkaline electrolyser is limited by $O_2$ and $H_2$ generation overpotentials, the charge transport and the gas transport and bubble formation on the electrode surfaces.

Hence, in a first aspect the invention provides an energy apparatus ("apparatus") especially having both an electrical energy storage functionality and an electrolysis functionality, the system comprising a functional unit, the functional unit comprising:

a first cell, comprising a first cell electrode and one or more first cell openings for a (basic) first cell aqueous liquid ("liquid") and for a first cell gas, wherein the first electrode especially comprises an iron based electrode;

a second cell, comprising a second cell electrode and one or more second cell openings for a (basic) second cell aqueous liquid ("liquid") and for a second cell gas, wherein the second electrode especially comprises a nickel based electrode;

a separator, wherein the first cell and the second cell share the separator, wherein the separator is configured to block transport of one or more of $O_2$ and $H_2$ from one cell to another while having permeability for at least one or more of monovalent hydroxide ($OH^-$), monovalent sodium ($Na^+$), monovalent lithium ($Li^+$) and monovalent potassium ($K^+$);

a first electrical connection in electrical connection with the first cell electrode, and a second electrical connection in electrical connection with the second cell electrode;

the energy apparatus further optionally comprising one or more of:

an aqueous liquid control system configured to control introduction of one or more of the first cell aqueous liquid and the second cell aqueous liquid into the functional unit;

a storage system configured to store one or more of the first cell gas and the second cell gas external from said functional unit;

a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system;

a charge control unit configured to receive electrical power from an external electrical power source and configured to provide said electrical power to said functional unit during at least part of a charging time at a potential difference between the first cell electrode and the second cell electrode of especially more than 1.37 V, such as more than 1.48V and even up to 2.0 V;

a first connector unit for functionally coupling to a receiver to be electrically powered and the electrical connection, and a second connector unit for functionally connecting a device to be provided with one or more of the first cell gas and the second cell gas with said storage system; and a control system ("controller") configured to control one or more of (and especially all of) the aqueous liquid control system, the storage system, the pressure system, and the charge control unit.

The main advantages of combining a battery and electrolyser in one device as presently claimed are numerous.

For instance, normally the overpotentials applied and the water splitting is considered a loss factor in the operation of a Ni—Fe battery. Here there is made use of that energy in the electrolysis process, resulting in higher overall efficiency. The heat dissipated during charging the battery and electrolysing water is required for generating hydrogen and oxygen. This required heat is a result from the increase in entropy when splitting liquid water in gaseous $H_2$ and $O_2$. The increase in entropy dS corresponds with an amount of heat TdS that is required to continue the reaction, next to supplying the Gibbs free energy dG. So in total the energy provided by the system equals dG+TdS=dH, where dG is provided as electrical power and TdS as heat.

Further, the hydrogen production occurs during chemical reduction of the iron electrode to Fe metal and also continuing for a desired period after that. It appears that the battery function operates better reversibly and only reaches its full capacity when overcharged like this. The original Ni—Fe batteries are however not charged that fully because then the energy efficiency is low because of the overpotentials that occur and the gassing, and also the electrolyte needs refilling. Here it is intentionally done (when there is sufficeint electricity supply each cycle), which actually appears to increase lifetime of the battery electrolyser. That such overcharging is allowed and intentionaly realised makes the power electronics also relatively simple; for normal battery systems overcharging is prevented at the individual cell level, making the battery cell management more demanding.

Yet also, for the battery functionality one requires massive numbers and volumes of battery cells to reach a high volume of energy storage (many kWh or MWh or even larger). This results automatically in large active surface area's inside the assembly of electrodes, which benefits the electrolysis functionality.

Further, for electrolysers one can use larger surface area, rough or porous Ni based electrodes in order to reach high current densities at not too high overpotentials. In practice such porous or rough surface area will be smaller than those possible in a battery that contains a larger amount of Ni for electricity storage. Also precious metals are still included as catalyst in conventional alkaline electrolysers but not necessary in the battery electrolyser.

Another advantage of the battery electrolyser is that it can generate hydrogen and oxygen at the pressure that is applied on the liquid electrolyte. This means that by the low energy demand pressurization of water and small electrical overpotentials directly high pressure hydrogen can be produced. Note that such electrochemical hydrogen production is significantly more efficient than mechanical hydrogen gas compression.

The current densities of the electrodes may be in the range of 0.001 to 10 A/cm$^2$ of the geometrical surface area of the electrodes, or more commonly 0.1-2 A/dm$^2$. It is further noted that for the battery electrolyser the current densities reached are high for typical battery charging since the (dimensioning of the) electrodes (is such that they) become fully charged within ~10 or ~1 hours for a current of 0.2 and 2 A/dm$^2$, respectively. For higher current densities up to 400 mA/cm$^2$ or up to 2000 mA/cm$^2$ as are used in electrolysers the battolyser may have positive and negative electrodes that have larger thickness, i.e. a storage capacity of up to e.g. 800 or 4000 mAh/cm$^2$ of electrode surface. A duration to full charge of about 5 hours is compatible with the daytime charging of the cell with electricity from solar power, leaving still more hours for producing hydrogen. The overpotentials for electrolysis remain low at such current densities because of the large active surface area available in the battery electrodes. This results in higher energy efficiency (typical electrolyser operates at 2.0V, the battery-electrolyser as defined herein operates in the range 1.48 to 2.0 V when producing hydrogen). The remaining overpotentials are required to generate the hydrogen and oxygen.

Also, no noble metals like Pt/Ru are required in the Fe based negative or Ni based positive electrode (cost reduction). Nevertheless, when desired a noble metal may be applied.

Further, a battery and electrolyser device has the advantage of being flexible in storing energy. When the battery is filled, still more energy can be stored in the gas. In a solar power system one clearly would dimension the battery appropriately for the required electricity use during the night and store excess electricity as gas e.g. for later use in winter. For the electricity grid the presence of the battery electrolyser has the advantage that there is now both a rapid response sink and source for current available. When there is a varying production of solar and wind power the electricity grid stability requires assets that are flexible in power uptake and delivery when there is too much or too little power generated. The switching time for this device from uptake of electricity to delivering electricity is particularly short, since it has a battery functionality.

Yet, also an economic benefit of a dual purpose device is that the time filling factor for its use can be very high: the battery can work day (charge) and night (discharge), and when charged completely the device is not idling because it (still) generates hydrogen and oxygen. For electrolysers running on renewables this is always a bottleneck in the calculations: how many hours are they actually going to be used since one normally first charges batteries before converting to hydrogen with the associated efficiency loss and only later one switches on the electrolyser. In the normal Ni—Fe battery the stored charge per Ni(OH)$_2$ weight is limited to the theoretical maximum of 289 mAh/gram, while in the battery electrolyser a multiple of that charge can be stored also as hydrogen, reducing the overall cost per stored energy unit.

Finally, the added cost for converting a battery into a battery electrolyser may not be so high because the electrode materials have to be there anyway. The pressure system and separator/diaphragm will present additional cost, however, but less than when building batteries and electrolyser separately. The system may also require one set of power electronics instead of two, which may be used continuously.

As indicated above, the energy apparatus has an electrical energy storage functionality and an electrolysis functionality. Hence, the apparatus is a combination of a battery and an electrolyser. By charging the battery, the battery gets ready for use and further hydrogen is produced. Even when the battery is filled, hydrogen production can be continued. This provides a charged battery and hydrogen, which production can e.g. take place when no consumption of energy or energy carrier of the apparatus takes place. The term "energy" especially relates to electrical energy. The term "energy carrier" especially relates to hydrogen gas (H$_2$), which can be used as fuel, e.g. for direct propulsion of an engine, but which may also indirectly be used, e.g. in a fuel cell for the generation of electricity. Hence, the apparatus may especially be used as charging point for vehicles for electricity and/or hydrogen (and/or O$_2$) (see also below).

The apparatus comprises a functional unit. However, in an embodiment of the energy apparatus, the apparatus may also comprise a plurality of functional units. Two or more of the functional units may be are arranged (electronically) in series, e.g. to increase the voltage difference. However, two or more of the functional units may also be arranged parallel, e.g. to increase the current. Further, when there are more than two functional units, also a combination of arrangements in series and parallel arrangements may be applied.

Especially, the functional unit comprising a first cell, comprising a first cell electrode and one or more first cell openings for a first cell aqueous liquid and for a first cell gas, wherein the first electrode especially comprises an iron based electrode, and a second cell, comprising a second cell electrode and one or more second cell openings for a second cell aqueous liquid and for a second cell gas, wherein the second electrode especially comprises a nickel based electrode.

Each cell at least comprises an opening for introduction of the respective aqueous liquids. The aqueous liquid used is especially a basic aqueous liquid, such as comprising one or more of KOH, LiOH, and NaOH. Especially, the concentration of OH$^-$ is at least 3 mol/l. Especially, the concentration of the hydroxide (especially one or more of KOH, NaOH and LiOH) in water is in the range of 4.5-8.4 mol/L (25-47 wt. % for KOH). Hence, these openings, respectively, may be configured as inlets of recycled electrolyte with water added to maintain the chosen concentration of KOH, LiOH and/or NaOH.

The first cell aqueous liquid and the second cell aqueous liquid within the cells are especially alkaline, such as at least 0.1 mmol/l OH, especially at least 3 mol/l OH, even more especially at least 3 mol/l OH, such as at least about 6 mol/l OH. The liquid in the cells may be supplemented with liquids from the aqueous liquid control system. Fresh water may not necessarily be alkaline, as the alkali in the cells may substantially be effectively not used. The "cell aqueous liquid" may also be indicated as electrolyte.

Further, each cell may also comprise a further opening, especially configured for removal of the aqueous liquid and/or for removal of gas. Both may escape from the same opening. The first cell gas especially comprises H$_2$ gas; the second cell gas especially comprises O$_2$. The aqueous liquid in the cell and the cell gas may escape from the same opening. Alternatively or additionally, two or more openings may be used, e.g. one for the removal of aqueous liquid and one for the removal of gas.

As each cell has two openings, the aqueous liquid may be flowed through each cell, where the flow aids in gas removal, cooling (or heating) when necessary and water refilling. Depending on the applied current per cm$^2$ electrode surface area the flow (in volume/area/time) may be for instance in the range of about 0.3 μl/cm$^2$/h-3.5 ml/cm$^2$/h (with the former value approximately corresponding to the value of 0.001 A/cm$^2$, and the latter value approximately corresponding to the value of 10 A/cm$^2$; see elsewhere herein).

Further, each cell comprises an electrode.

The first cell comprises the first electrode, which especially comprises an iron-based electrode. The iron based electrode may comprise in a charged state essentially Fe (metal) and in a discharged state essentially Fe(OH)$_2$, as was the case in the Edison Ni—Fe battery.

The iron based electrode especially is produced following the procedure as follows. Iron is first dissolved in dilute H$_2$SO$_4$ and to produce ferrous sulphate. The latter is purified by recrystallization and roasted at 1070-1120 K. The roasted mass is washed thoroughly with water and then dried. The dried material is treated with hydrogen at 1020-1070 K for chemical reduction and again subjected to partial oxidation at 970-1070 K. This latter process yields a mixture of iron powder and magnetite. The mixture is blended with additional agents (Cu, FeS, HgO, etc.) and put into pockets made from perforated-steel sheet plated with nickel. The pockets are fixed over a suitable nickel-plated steel plate to form the negative electrode. Hence, especially the iron based electrode is made as described by Chakkaravarthy et al. in Journal of Power Sources, 35 (1991) 21-35, which is herein incorporated by reference, using perforated pockets made from Ni plated steel. The active iron material may further be bound by sintering, or may alternatively be bound by PTFE or polyethylene. Alternatively or additionally, the first electrode comprises conductive additives such as carbon or Ni. In contrast with the often described Ni—Fe battery the additives such as sulfides (FeS, Bismuth sulfide, HgO, etc.) or other to suppress hydrogen evolution are not used, or alternatively reduced in concentration, since in the battery electrolyser hydrogen evolution is aimed to be occurring at reduced overpotentials. Additives to reduce the hydrogen generation overpotential further may be a small mass percentage of the following: Ni—Mo—Zn codeposited with Fe, or alternatively Ni—S—Co, Ti$_2$Ni, nitrogen doped graphene, Ni—Mo—N, Ni(OH)$_2$ nanoparticles, Ni—Cr, nanocrystalline Ni$_5$P$_4$, Ru, RuO$_2$, AgNi, or the noble elements Pd, Pt, etc. The electrode porosity can be maintained during pressing the electrodes by adding e.g. NaCl to the electrode, pressing, and then leaching out the NaCl to introduce the porosity. The total electrode thickness in its pockets is 2-5 mm, more particularly around 3.5 mm. The term "first electrode" may also relate to a plurality of first electrodes.

The second cell comprises the second electrode, which especially comprises a nickel based electrode. The nickel based electrode may comprise in a charged state essentially NiOOH and in a discharged state essentially Ni(OH)$_2$.

The nickel based electrode especially is produced in the way described for sintered porous Ni(OH)$_2$ electrodes in also Journal of Power Sources, ibid, which is herein incorporated by reference. Sintered electrodes are intended for high to extremely high loads. Carbonyl Nickel powder is embedded bilaterally on a suitable substrate and sintered under a reducing atmosphere at about 1120 K to produce a porous matrix. The substrate may be one of the following materials nickel netting or nickel-plated mild steel netting, perforated nickel foil or nickel plated, perforated mild steel foil, nickel-fibre mat or nickel-plated steel-fibre mat. Bilateral embedding of the carbonyl nickel powder is carried out prior to sintering under dry conditions using a graphite mould. This process is termed a "dry powder sintering" or "loose sintering" "Wet slurry sintering" is another approach wherein a nickel powder slurry of suitable consistency is used. Stable plates of definite thickness and 80-90% porosity are produced by these methods. Nickel hydroxide and cobalt hydroxide are incorporated into the pores of the nickel plaques by vacuum impregnation or by electrochemical method. Alternatively or additionally, the second electrode comprises no or reduced amount of Co additive compared to normal Ni—Fe batteries; Co is often added in Ni(OH)$_2$ electrodes for Ni—Fe batteries to reduce the equilibrium potential and oxygen evolution, while here this suppression is not required. Alternatively or additionally, the second electrode comprises conductive additives such as carbon or Ni. The term "second electrode" may also relate to a plurality of second electrodes. Further oxygen evolution catalysts next to the NiOOH from the electrode to reduce the overpotential for oxygen evolution can be added. These may be low weight percentage of spinel type Co$_3$O$_4$, or spinel type NiCo$_2$O$_4$ or Ni and La doped Co$_3$O$_4$, Li doped Co$_3$O$_4$, La$_{0.5}$Sr$_{0.5}$CoO$_3$, Ni$_{0.2}$Co$_{0.8}$LaO$_3$, (Pr$_{0.5}$Ba$_{0.5}$)CoO$_{3-x}$, Ni—Fe hydroxides such as Ni$_{1-x}$Fe$_x$(OH)$_2$, or NiO/NiFe$_2$O$_4$. Alternatively, also up to 25% Al substitution of Ni in Ni(OH)$_2$ can be performed to yield higher capacity and electrochemical activity, as reported in Journal of Power Sources 203 (2012) 177-183.

The first cell and the second cell share a separator, but are separated from each other by this separator. Hence, liquid may not flow form one cell to the other via the separator. Also, hydrogen gas and/or oxygen gas may not flow from one cell to the other via the separator. However, the separator may be permeable for specific ions, such as at least one or more of OH$^-$ ions, neutral H$_2$O, monovalent sodium (Na$^+$), monovalent lithium (Li$^+$), and monovalent potassium (K$^+$). Hence, the first cell and the second cell share the separator, wherein the separator is configured to block transport of one or more of O$_2$ and H$_2$ from one cell to another while having permeability for at least one or more of OH$^-$ ions, neutral H$_2$O, monovalent sodium (Na$^+$), monovalent lithium (Li$^+$), and monovalent potassium (K$^+$), especially all. Hence, especially the separator may have a relative high ionic conductivity and a relatively low ionic resistance. For instance, the ionic resistance is lower than ≤0.3 Ω·cm$^2$ in 30 wt. % KOH solution (at 30° C.). The separator may e.g. comprise a membrane, such as electrolysis membranes known in the art. Examples of membranes may e.g. include alkaline resistant polymer membranes and polymer composite mambranes, such as e.g. a Zirfon (from Agfa) membrane. Such membrane may e.g. consist of a polymer matrix in which ceramic micro-particles (zirconium oxide) are embedded. This body is reinforced internally with a mesh fabric made from monofilament polyphenylene sulphide (PPS) or polypropylene (PP) fabric. It has a controlled pore size of about 0.15 μm and bubble point (especially defined as gas pressure against one side of the membrane required to form bubbles at the other side where there is liquid) of about 2+/−1 bar (over pressure). Such membrane may be permanently hydrophilic, by incorporated metal oxide particles, perfectly wettable in water and most common electrolytes. Such membrane may be stable in strong alkaline (up to 6M KOH) and up to 110° C. The pore size may e.g. be in the range of about 0.05-0.3 μm, such as about 0.15 μm; the thickness may e.g. be in the range of about 100-1000 μm, such as about 500 μm. Between the separator and each electrode, a respective spacer may be configured. These spacers may include openings for transport of the aqueous liquids and provinding acces for these liquids to the respective electrode.

In this way, a functional unit is provided which is substantially closed, except for the herein indicated openings. For electrical connection, the electrodes may be connected with an electrical connection which is also accessible from external from the functional unit. Hence, the functional unit may further comprise a first electrical connection in electrical connection with the first cell electrode, and a second electrical connection in electrical connection with the second cell electrode.

For a good processing with the functional unit, the apparatus may comprise one or more of an aqueous liquid control system, a gas storage system, a pressure system, a charge control unit, a first connector unit, a second connector unit, and a control unit. Further, additionally the apparatus may comprise a thermal management system and/or thermal insulation. Especially, the energy apparatus comprises all these items.

Hence, in an embodiment the energy apparatus may further comprise an aqueous liquid control system configured to control introduction of one or more of the first cell aqueous liquid and the second cell aqueous liquid into the functional unit. Such aqueous liquid control system may include one or more valves. Further, such aqueous liquid control system may—during operation—functionally be connected with a service pipe for water. In combination with the pressure system (see also below), the aqueous liquid may also be provided under pressure to the functional unit (see further also below). Further, the aqueous liquid control system may include storage for caustics, such as one or more of NaOH, LiOH, and KOH, especially at least KOH. The aqueous liquid control system may independently provide the liquid to the first cell and the second cell. Further, the aqueous liquid control system may include a return system, configured to receive the liquid downstream from the first cell and/or the second cell and reuse at least part of the first liquid and/or second liquid. The term "aqueous liquid control system" may also refer to a plurality of aqueous liquid control systems.

Further, in an embodiment the energy apparatus may further comprise a storage system configured to store one or more of the first cell gas and the second cell gas external from said functional unit. Hence, storage may be done external from the functional unit. To this end the apparatus may comprise a storage system configured to store $H_2$ and/or a storage configured to store $O_2$. At least, the apparatus may comprise a storage configured to store $H_2$. In combination with the pressure system (see also below), the storage system may also be configured to store the one or more of the first cell gas and the second cell gas under pressure (see further also below). The term "storage system" may also refer to a plurality of storage systems.

Hence, in an embodiment the energy apparatus may further comprise a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system. To this end, the pressure system may comprise a pump, a valve, etc. In an embodiment, the pressurize system essentially comprises one or more valves. The term "pressure system" may also refer to a plurality of pressure systems. Especially when two or more different types of fluids have to be pressurized, two or more independent pressurize systems may be applied.

In yet a further embodiment the energy apparatus may further comprise a charge control unit configured to receive electrical power from an external electrical power source (see also below) and be configured to provide said electrical power to said functional unit during at least part of a charging time at current (sometimes also indicated as "current strength") that results in a potential difference between the first cell electrode and the second cell electrode of more than 1.55 V at 18° C. and 1.50V at 40° C., i.e. in practice thus at least 1.50 V. Starting from the discharged state the current is first applied to mainly charge the battery; by applying this current voltages reach up to 1.65V at 18° C. and 1.55V at 40° C. before the battery is approximately fully charged, i.e. in practice thus at least 1.55 V. Progressively more hydrogen is produced after the battery capacity is reached and the voltage can then reach up to 1.75V (at 18° C.) and 1.62V at 40° C., i.e. in practice thus at least 1.62 V. The energy efficiency of the battery functionality charging and the electrolytic gas production is calculated as the integral of the battery output current times its voltage integrated over discharge time plus the higher heating value (HHV) of the amount of hydrogen gas produced during charge and (self-)discharge over the total cycle, divided by the integral of the input current times its voltage over the charge time. It appears that very good results are obtained in terms of total energy efficiency, even when going well above the normal voltage upper limits of 1.65 (at 18° C.) or 1.55V (at 40° C.) (i.e. in practice thus at least 1.55 V) for Ni—Fe charging for full nominal charge, and especially when charging/inserting current far beyond the nominal capacity of the Ni and Fe battery electrodes. The charge control unit may include electronic devices to convert high voltages to the required voltage and/or to convert AC voltage to DC voltage. Especially, in an embodiment of the energy apparatus, the charge control unit configured to provide said electrical power to said functional unit during at least part of a charging time at a current that results in a potential difference between the first cell electrode and the second cell electrode selected from the range of 1.4-1.75 V. Best results in terms of battery electrochemical reversibility, gas amount production, and overall energy efficiency are obtained for applied currents that result in cell potentials in this voltage range.

For discharge best results are obtained when discharge is continued to a level preferably not lower than 1.10V for the cell. The control system, optionally in combination with the charge control unit, may also be configured to control discharging of the functional unit. Discharging may be done to an industrial object or vehicle, etc., using electrical energy. However, alternatively or additionally, the functional unit may also be discharged to an electricity grid.

Further, the charge control unit may be configured to provide said electrical power to said functional unit during at least part of a charging time at a current corresponding to the nominal battery capacity C expressed in Ah divided by minimum of 2 h, i.e. C/time with time >2 h. Such applied currents may lead to a potential difference between the first cell electrode and the second cell electrode of especially more than 1.37 V, but especially at maximum not more than 2.0 V As indicated above, the apparatus may further include thermal insulation, especially configured to keep loss of thermal energy from the functional unit low. Further, the apparatus may comprise a thermal management system, configured to keep the temperature of the unit equal to or below a predetermined maximum temperature, for instance equal to or below 95° C. Hence, in an embodiment, especially for large systems (such as 10 kW or more), the temperature of the cells is monitored and the applied charge and discharge currents may be reduced when the temperature rises above the set limit of 60° C. The thermal management system may at least partly be comprised by the control system, i.e. with respect to the controls. Further, the thermal isolation may be comprised by the thermal management system.

As indicated above, the energy apparatus may include a plurality of functional elements, configured electrically in series and or parallel, such as to increase the potential difference (in series) and or the charge (parallel) that can be provided.

In an embodiment the energy apparatus may further comprise a first connector unit for functionally coupling to a receiver to be electrically powered and the electrical connection. An example of a device may be a car (see also below). Hence, especially the apparatus may include a(n electrical) plug or a socket that can be connected to such device, which may thus especially include a socket or a plug. The first connector is especially configured to transfer electrical power from the apparatus to a receiver, such as an external device, such as a battery of such device, or to an electricity grid. The term "first connector unit" may also refer to a plurality of first connector units.

In an embodiment the energy apparatus may further comprise a second connector unit for functionally connecting a device to be provided with one or more of the first cell gas and the second cell gas with said storage system. Hence, especially the apparatus may include a(n hydrogen gas) plug or a socket, that can be connected to such device, which may thus especially include a socket or a plug. The second connector is especially configured to transfer hydrogen gas from the storage to a receiver, such as an external device, such as a hydrogen storage unit of such device, or to a gas grid. The term "second connector unit" may also refer to a plurality of second connector units. Note that the receiver for the gas is not necessarily the same as the receiver for the electricity.

Yet, in an embodiment the energy apparatus may further comprise a control system configured to control one or more of the aqueous liquid control system (if available), the storage system (if available), the pressure system (if available), and the charge control unit (if available). The control system is especially configured to control the apparatus, and the individual elements, especially the aqueous liquid control system, the storage system, the pressure system, and the charge control unit. In this way, the charging and electrolysis process may be optimized at maximum efficiency, amongst others e.g. dependent upon the availability of electrical power from an external electrical power source and the consumption of electrical power and/or hydrogen gas. Hence, in a specific embodiment of the energy apparatus, the control system is configured to control the charge control unit as function of a charge status of the functional unit and an availability of electrical power from the external electrical power source. Yet further, the control system is configured to control the charge control unit as function of a charge status of the functional unit, the status of a gas storage (full or further fillable), and an availability of electrical power from the external electrical power source. Optionally, the charge control unit may also be configured to feed electricity back into the electricity grid. The control system may especially be configured to control the operation conditions of the energy apparatus as function of electricity demand and/or gas demand from one or more clients (like the devices herein indicated) and/or availability of electricity (in the grid). Hence, the control system may amongst others control one or more of temperature, liquid flow, voltage difference, voltage sign, etc., as function of the presence of external demand and/or the type of external demand ($H_2$ and/or electricity).

An important cost determining factor in the electrolyser-battery is the nickel metal content (nickel is substantially more expensive than iron). For this reason in an embodiment the amount of $Ni(OH)_2$ material may be reduced significantly with respect to the nominal capacity of the active Fe based electrode. The Ni based cathode may thus have a capacity of e.g. 50% or of even only 10% of the Fe based electrode available in the reaction $Ni(OH)_2+OH^-$ $\Rightarrow NiOOH+H_2O+e^- \Rightarrow$. Hence, in an embodiment the Ni based electrode has a capacity in the range of 80-10% of the Fe based electrode. The result is that during charge the $O_2$ evolution starts earlier while at the negative electrode still the reaction $Fe(OH)_2+4e^- \Rightarrow Fe+4OH^- \Rightarrow$ continues to produce Fe. The potential then increases to higher input potential earlier and more oxygen is produced. The oxygen is collected for later use during discharge when at the Ni electrode both the normal reaction $NiOOH+H+e^- \Rightarrow Ni(OH)_2$ takes place but in addition also the oxygen reduction reaction $O_2+2H_2O+4e^- \Rightarrow 4OH^-$ takes place at the $NiOOH/Ni(OH)_2$ surface. Such reaction occurs at a somewhat lower potential than the $NiOOH+H++e^- \Rightarrow Ni(OH)_2$ reaction alone because of the lower redox potential and the overpotentials required to reduce molecular $O_2$. In this way a lower amount of Ni in the electrode is possible at the expense of some overall reduced energy efficiency. After the excess Fe is formed the production of the hydrogen follows when the Fe(OH) is depleted, but also via the continuous 'self-discharge reaction' of $Fe+2H_2O \Rightarrow Fe(OH)_2+H_2$ that is also present. The choice for the amount of $Ni(OH)_2$ can therefore be an economic consideration of the materials cost versus the energy efficiency. The theoretical capacity to store charge in $Ni(OH)_2$ and $Fe(OH)_2$ is 289 mAh/g and 596 mAh/g respectively. Hence, in an embodiment of the energy apparatus, the first electrode has a first capacity depending on the active mass of iron based electrode material and the second electrode has a second capacity depending on the active mass of nickel based electrode material, wherein the second capacity in the nickel electrode is less than 90% of the first capacity in the iron based electrode, while in a specific embodiment the remainder of the capacity stems from the oxygen reduction to water at this nickel based electrode.

Yet, in a further aspect the invention also provides a system including the energy apparatus as defined herein. Such system may further include a power source, especially an electrical power source. Hence, an embodiment comprises an energy system comprising the energy apparatus as defined herein and an external (electrical) power source. The power source may be used to charge the functional unit (i.e. to charge the battery). The apparatus may be functionally connected to a mains. However, the apparatus may also be functionally connected to a local electrical power generator. For instance, a plant generating biomass or a site where biomass is collected, may include a device for converting biomass into electricity, which can be used for powering the apparatus. Likewise, a local wind turbine, or local wind turbines, or a local photovoltaic or local photovoltaics, or a local water turbine, or local water turbines, may be used to provide electrical power to the apparatus. Of course, such external power source may also be integrated in an electrical power infrastructure, which may include various renewable and conventional power plants. Hence, in an embodiment the external power source comprises one or more of a photovoltaic cell, a wind turbine, and a water turbine. Hence, the energy apparatus may be comprises in one or more of an electrical energy grid, a $H_2$ gas grid and an $O_2$ gas grid.

The term "energy apparatus" may also refer to a plurality of "energy apparatus. Hence, in an embodiment the energy system may comprise a plurality of energy apparatus and a plurality of external power sources. These energy apparatus and external power forces are functionally associated, such as via an electricity grid. For instance, in an embodiment the energy apparatus are arranged remote from each other along highways and roads. The energy system may further include an electricity grid. Especially, the external power sources may be functionally coupled to this electricity grid. Also industry, houses, etc., may functionally be coupled to such electricity grid. Hence, in an embodiment the energy system may comprise a plurality of energy apparatus and a plurality of external power sources and an electricity grid.

Yet, in a further aspect the invention also provides a method of storing electrical energy and one or more of hydrogen ($H_2$) and oxygen ($O_2$) with a single battery electrolyser. Especially, the invention also provides a method of storing electrical energy and one or more of hydrogen ($H_2$) and oxygen ($O_2$) with the energy apparatus as defined herein, the method comprising providing the first cell aqueous liquid, the first cell aqueous liquid, and electrical power from an external power source to the functional unit thereby providing an electrically charged functional unit and one or more of hydrogen ($H_2$) and oxygen ($O_2$) stored in said storage system, wherein during at least part of a charging time the functional unit is charged at a potential difference between the first cell electrode and the second cell electrode of especially more than 1.37 V, even more especially at least 1.55 V. Even more especially, during at least part of a charging time a current is selected resulting in a potential difference between the first cell electrode and the second cell electrode that is selected from the range of 1.50-2.0 V, such as 1.55-1.75 V, like at least 1.6V. Further, especially a current density may be selected from the range of 0.001-10 $A/cm^2$.

Hence, in an embodiment during at least part of a charging time a current is selected resulting in a potential difference between the first cell electrode and the second cell electrode that is selected from the range of 1.50-2.0 V, such as 1.55-1.75 V, like at least 1.6V. Further, especially a current density may be selected from the range of 0.001-10 $A/cm^2$, such as 0.001-2 $A/cm^2$. Hence, in an embodiment the charge control unit configured to provide said electrical power to said functional unit during at least part of a charging time at a potential difference between the first cell electrode and the second cell electrode selected from the range of 1.6-2.0 V and at a current density selected from the range of 0.001-10 $A/cm^2$. Here, the area refers to the external area of the electrodes, as known in the art. For instance, an electrode having an area of 1 $cm^2$ with nickel material or iron material has an external area of 1 $cm^2$, notwithstanding the fact that the nickel material or iron material may have a very high surface area. Therefore, the term "external" area is used. Especially, the external area is defined by just the outside surface of the perforated metal pockets. Herein, instead of the term "external area" also the term "geometrical surface area" may be applied. The electrode material inside is especially nanostructured and may thus have a large surface area, e.g. in $m^2/g$ range, but here it is especially referred to a cross-sectional area (cross-section parallel to the plane of the electrode(s)). Especially, all current should also go through the separator, so that can also be used as a definition; it has about the same surface area as the external shape of the respective metal pockets, i.e. of the surface of the respective electrodes.

In yet a further embodiment, the method may comprise maintaining a first pressure in the first cell and a second pressure in the second cell at a pressure of at least 200 bar, such as in the range of 200-800 bar. Further, the method may also comprise maintaining a pressure in the storage over 1 bar, such as in the range of up to 800 bar, especially 200-800 bar. As indicated above, pressures in the first cell and second cell may be controlled independently of each other. Likewise, when both storing $H_2$ and $O_2$, the pressure of the $H_2$ and $O_2$ in the storage may be controlled independently, when desired.

During charging, especially the temperature of the functional unit is especially kept at a temperature in the range of −10-+60° C., even more especially at a temperature of at least 10° C. To this end, the energy apparatus may also include a temperature control unit. Especially, the control unit may be configured to limit the temperature of the functional element by reducing the applied current when the temperature rises above the set limits. Further, the apparatus, especially the functional unit may include thermal isolation.

The energy apparatus and/or the energy system may in embodiments especially be used for providing one or more of electrical power, hydrogen ($H_2$) and oxygen ($O_2$) to a device. For instance, such device may be a battery (for electrical power), or a device comprising such battery, like a car. Such device may also be a hydrogen storage unit, or a device comprising such hydrogen storage unit. Further, such device may be an apparatus using oxygen in a production process. Hence, in an embodiment the energy apparatus and/or energy system are used for providing one or more of electrical power, hydrogen ($H_2$) to a motorized vehicle comprising an engine deriving its propulsion energy from one or more of a hydrogen source and an electrical power source. The vehicle may e.g. be a car requiring hydrogen, electrical power, or both. However, in other embodiments the device may be comprised by an industrial object, such as an apparatus using oxygen and/or hydrogen (chemical hydrogenation, ammonia synthesis, chemical reduction, etc.) in a production process. Such industrial object is especially configured to utilize one or more of electrical power, hydrogen and oxygen.

The energy apparatus and/or the energy system are also especially used to store electricity in the battery functionality and also in hydrogen. As such it is also used to take up excess electrical power from e.g. varying renewable electricity sources, and supplying the stored energy either as electricity or hydrogen to subsequently arising demands.

Hence, amongst others the invention provides a method of storing varying or intermittent electrical energy and one or more of hydrogen ($H_2$) and oxygen ($O_2$) with an energy apparatus, the method comprising: providing the first cell aqueous liquid, the second cell aqueous liquid, and electrical power from an external power source to the functional unit thereby providing an electrically charged functional battery unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1e schematically depict some aspects of the invention;

Figure 1A:
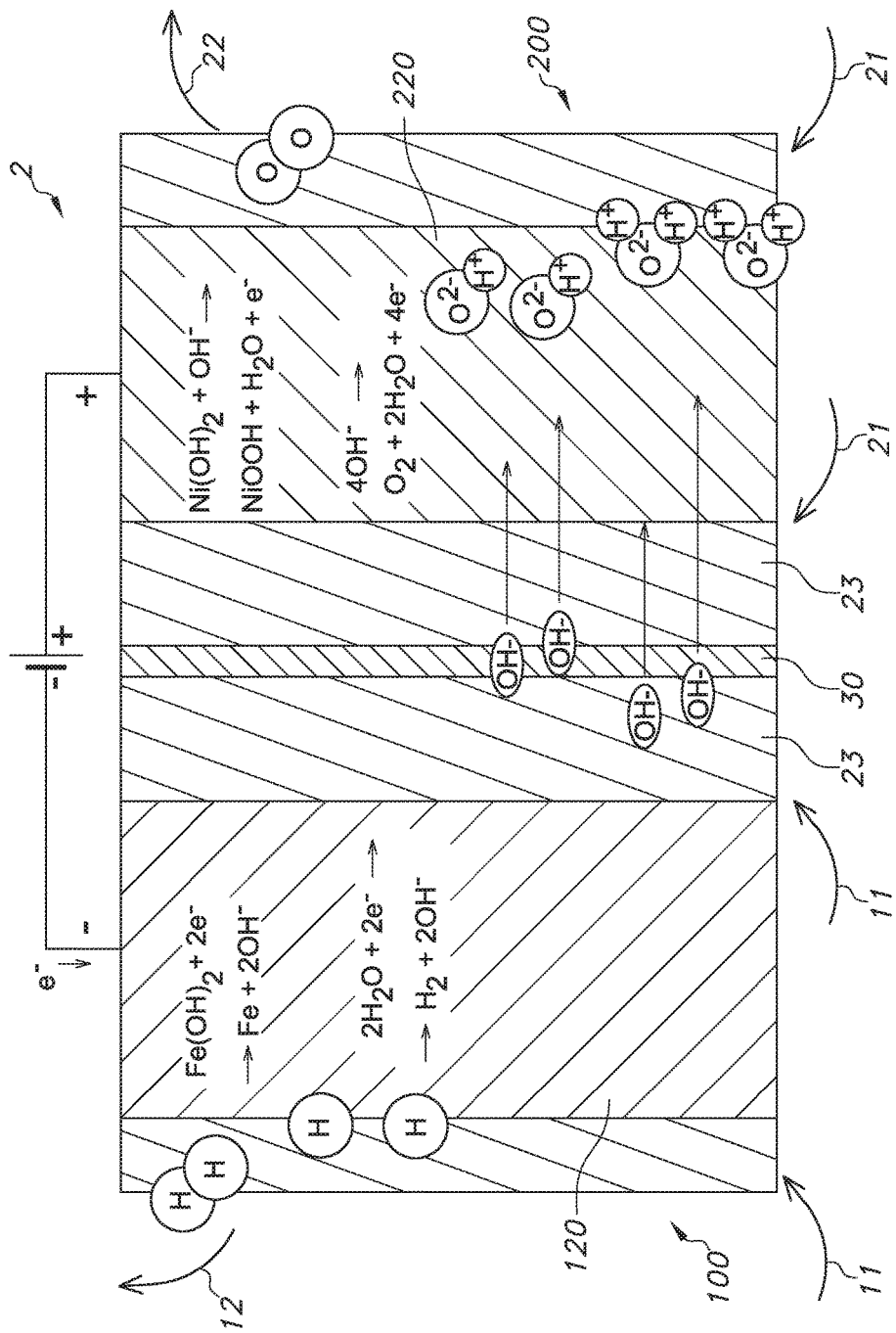
Figure 6A:
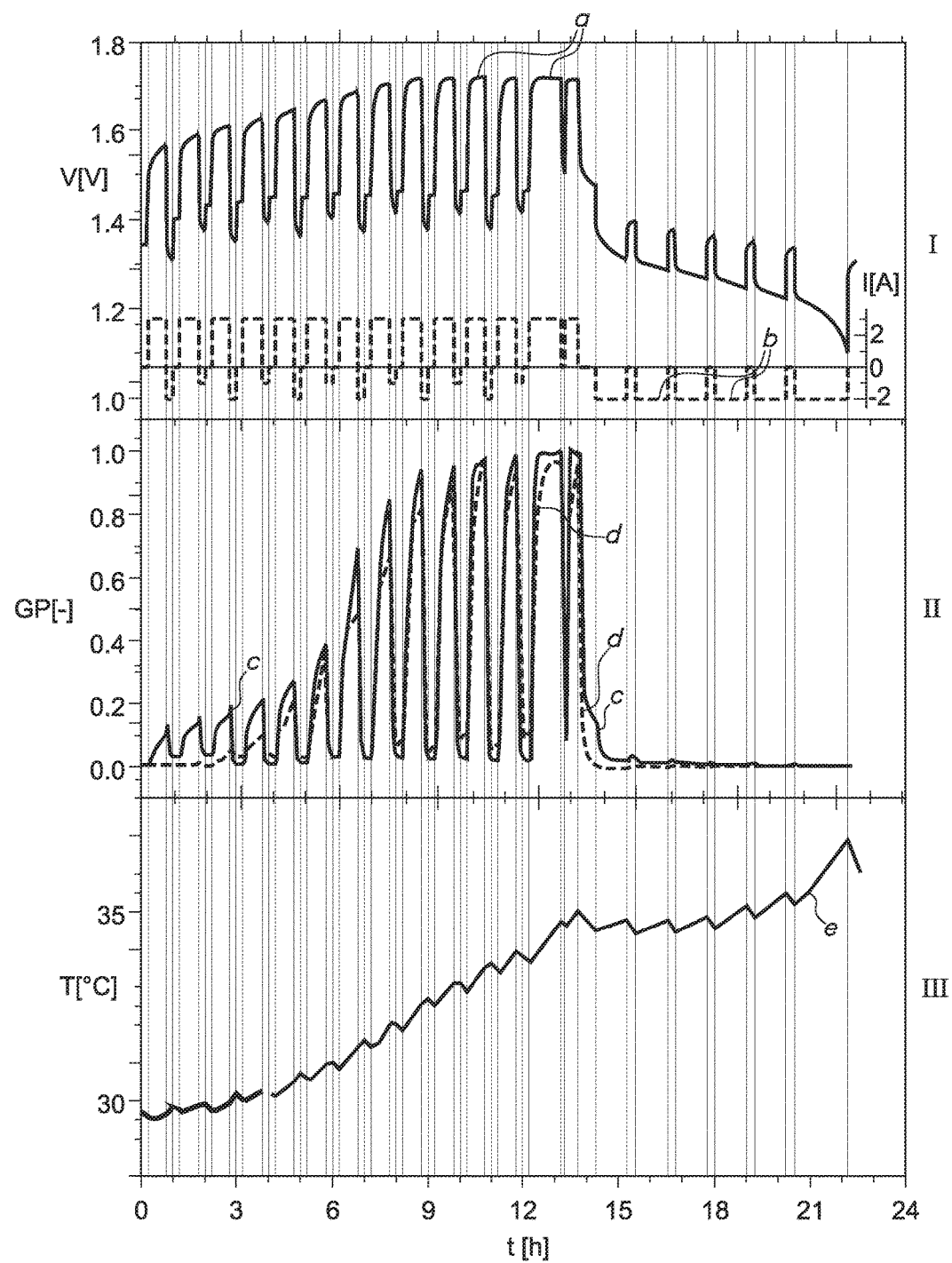

Top (I): observed potential during constant current charge insertion during increasing durations, followed by a full discharge to 1.1V; curve a indicates the voltage (left y-axis) resulting from the applied currents during the indicated times (days) on the x-axis; curve b indicates the applied currents (right axis) with charge rate C/5 and discharge rate C/10 over time (days) (same x-axis);

middle (II): resulting normalized hydrogen and oxygen evolution; curve c indicates oxygen ($O_2$); and curve d indicates hydrogen ($H_2$); "GP" (y-axis) indicates normalized gas production over time (days) (x-axis);

bottom (III): temperature (T) in ° C. development for a thermally insulated cell over time (days) (x-axis);

lowest (IV) battolyser utilization of charge in the battery and the $H_2$ production (expressed in amount of charge required to generate the $H_2$) divided by the nominal battery discharge capacity of C=10 Ah (measured at constant temperature of T=30° C.); CU/CB indicates charge utilization divided by the nominal battery discharge capacity; CI/CB indicates charge insertion divided by the nominal battery discharge capacity; curve a indicates the battery charge+$H_2$ yield; curve b indicates the $H_2$ yield; curve c indicates the battery charge; reference d indicates the flexible $H_2$ production; reference e indicates the nominal battery charge capacity;

FIG. 5:

Top (I): test of a battery-electrolyser cell for many cycles with on the x-axis the cycle numbers (CN). A cycle is counted from full discharge to full discharge with various full or partial (over/dis)charge programs in between; the y-axis indicates CC/CB which is charge divided by nominal battery discharge capacity; curve a is the charge used for electrolysis, curve b displays the inserted charge which is subsequently discharged from the battery and curve c displays the total inserted charge divided by the nominal battery discharge capacity;

middle (II): overall energy efficiency as sum of partial battery plus hydrogen gas production efficiency (see also below) (with on the x-axis the cycle numbers (CN)). Depending on charge insertion amounts the $H_2$ production ranges from much higher to much lower than the battery charge. Consistently the overall efficiency adds up to above 80 to 90%; curve d displays the overall efficiency; curve e indicates the partial battery efficiency and curve f displays the partial electrolyzer efficiency; PE/OE indicates partial and overall efficiency;

bottom (III): cumulative inserted charge and breakdown in battery charge and electrolysis, and the cumulative $H_2O$ mass to replenish the electrolyte expressed with respect to the battery capacity with on the x-axis the cycle numbers (CN)); the y-axis indicates CC/CB cumulative charge added up for the different cycles divided by the nominal battery discharge capacity; curve g indicates the cumulative inserted charge, curve h indicates the cumulative discharge from the battery, an curves i (at cycle number over about 150 slightly higher than) j indicate the added $H_2O$ mass expressed in charge equivalent and the electrolysis yield expressed in charge equivalent, respectively;

FIG. 6a (x-axis time in hours):

Top (I): sequence of intermittent charge, discharge and rest steps that shows the switching capabilities of current insertion followed by immediate current withdrawal, rests and electrolytic gas evolution; with on the y-axis the voltage (left) or the current (A) (right), and curve a indicating the voltage and curve b indicating the current;

middle (II): the measured normalized hydrogen and oxygen yields, with curve c indicating the oxygen and curve d indicating hydrogen generation, with on the y-axis the normalized gas production (GP);

bottom (III): the temperature (T in ° C.) of the thermally insulated cell following the instantaneous heating from residual overpotential losses due to Ohmic resistances, with curve e indicating the temperature curve.

Figure 6B:
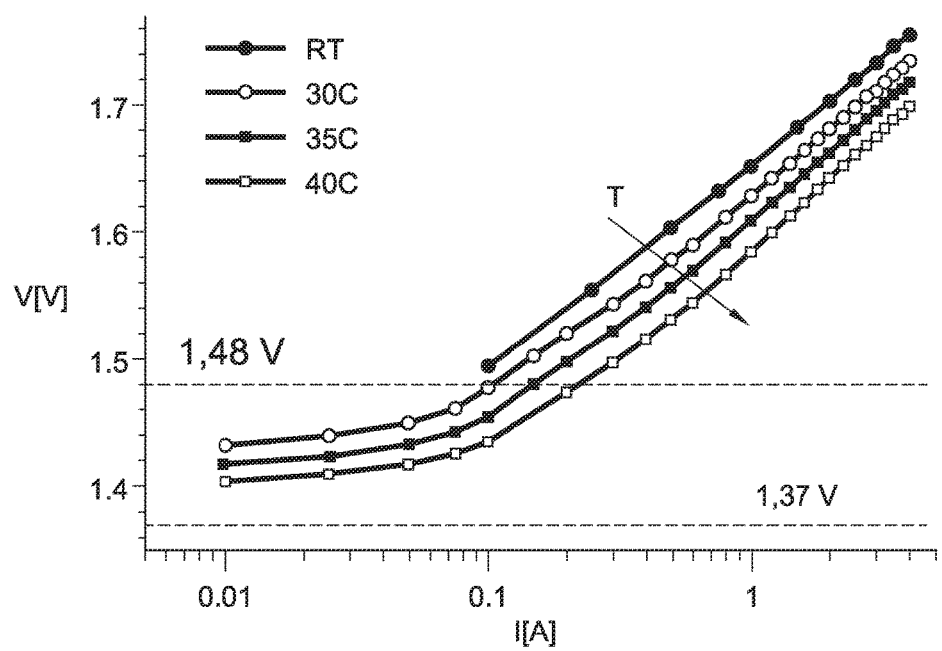

FIG. 6b: Electrolysis potential (Voltage (V) on the y-axis) dependence on applied current (x-axis) for several temperatures. The total external electrode surface area is 216 cm². At the current densities used (up to 20 mA/cm²) the Zirfon gas separation diaphragm leads at low T to a small additional overpotential and efficiency decrease of up to 3% at most. At higher T the ionic resistance decreases, mitigating such losses.

Figure 7A:
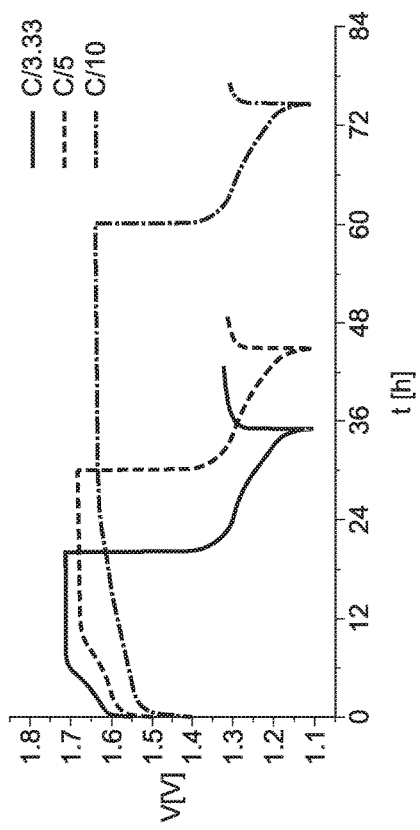
Figure 7B:
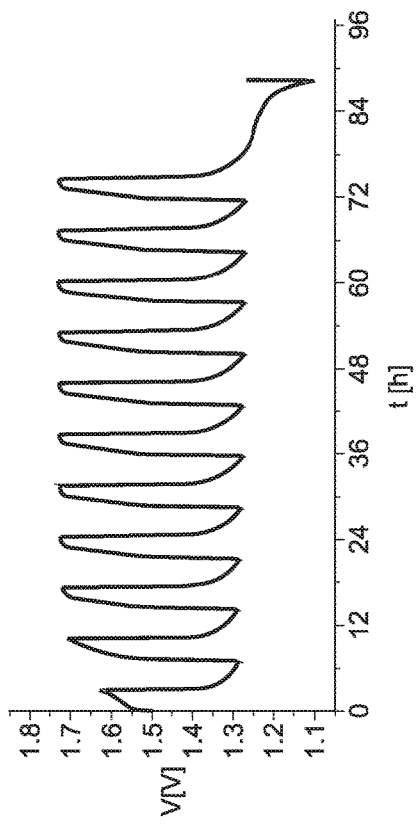
Figure 7C:
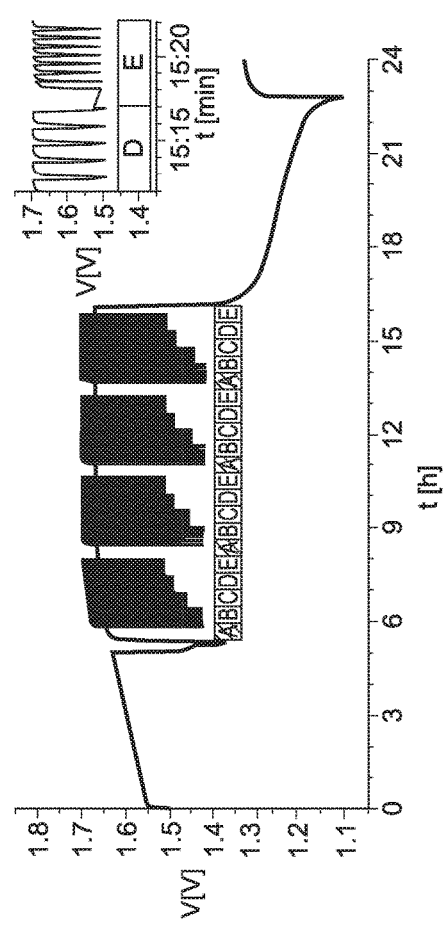
Figure 7D:
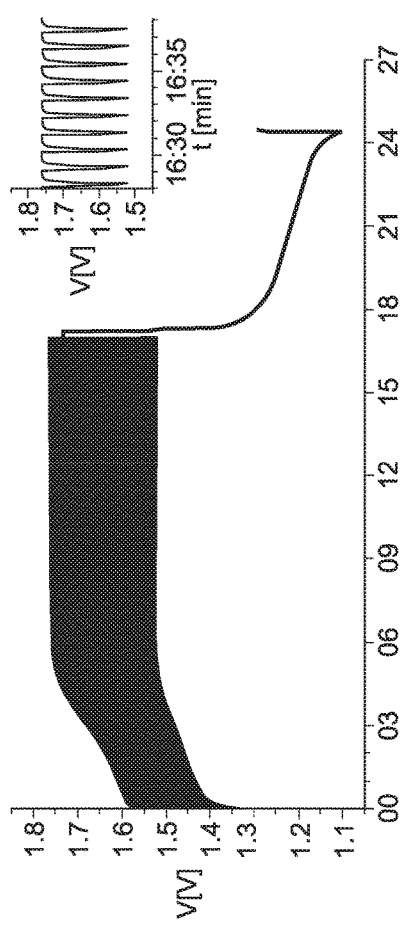

FIG. 7a: charging to 6 C at various charge rates; discharge at C/10 rate; the test time in hours (h) and the voltage on the y-axis in volt;

FIG. 7b: cycling of the charge electrode, charge rate C/3.33, discharge rate C/10. Partial charge insertion (11 times) of 0.9 C is followed by discharge (10 times) of 0.4 C; 0.4 C of 0.9 C are used to charge the battery the remaining part, 0.5 C, for electrolysis; the test time is in hours (h), the voltage is in volt (y-axis);

FIG. 7c. Switching test at charged electrode: first 5 hour charge at C/3.33 rate then switching; sequence A-E: A: 30 min charging at constant rate C/3.33; B: 5 cycles 5 min charge followed by 1 min discharge; C: 2.5 min charge followed by 30 sec discharge; D: 50 sec charge followed by 10 sec discharge; E: 25 sec charge followed by 5 sec discharge; for B-E: charge rate C/2.5 and discharge rate C/5, average rate C/3.33; one minute rest between programs A-E; the test time is in hours (h) (insert graph is in minutes), the voltage is in volt (y-axis);

FIG. 7d: Continuous fast switching test, 1000 cycles of 50 sec charge insertion (C/2.5) and 10 sec of charge withdrawal (C/5) completed by a final discharge; the test time is in hours (h) (insert is in minutes), the voltage is in volt (y-axis).

The schematic drawings are not necessarily on scale.

DETAILED DESCRIPTION OF THE EMBODIMENTS

FIG. 1a schematically depicts some aspects of an embodiment of a functional unit 2. More details are shown in the embodiment of FIG. 1b. FIGS. 1a (and 1b) schematically shows the functional unit 2 comprising: a first cell 100, a second cell 200, and a separator 30. The first cell 100 comprises a first cell electrode 120. Especially, the first electrode 120 comprises an iron based electrode. The second cell 200 comprises a second cell electrode 220. The second electrode 220 especially comprises a nickel based electrode. Further, the first cell 100 and the second cell 200 share the separator 30. The separator is configured to block transport of one or more of $O_2$ and $H_2$ from one cell to another while having permeability for at least one or more of OH⁻, monovalent sodium ($Na^+$), monovalent lithium ($Li^+$) and monovalent potassium ($K^+$). As indicated above, the separator 30 especially comprises a membrane. Further, the separator 30 and the electrodes 120 and 220 may be spaced apart with a spacer, indicated with reference 23. This spacer may be configured to provide a spacing between the electrode and the separator, but also allow the water based electrolyte to come into contact with the electrode at the separator side of the electrode. Hence, first and second cell aqueous liquids 11,21 may pass at both sides of the respective electrodes 120,220.

The separator 30 and the respective electrodes 120,220 may substantially have the same surfaces areas, i.e. external surface areas, and may thereby form a stack (with especially the spacers in between). Hence, the electrodes and the separator may substantial have the same heights (as depicted here) and the same width (here the plane perpendicular to the plane of drawing).

Especially, the functional unit 2 is an integrated unit substantially entirely enclosed by pressure containment. As will be further also described below, the functional unit may comprise a plurality of first cells and second cells.

During charging, the following reaction may take place at the first electrode 120: $Fe(OH)_2+2e^- \Rightarrow Fe+2OH^-$ (−0.877 V vs. SHE), followed by $2H_2O+2e^- \Rightarrow H_2+OH^-$ (−0.83 vs. SHE). Hence, when the battery is charged, Fe may act as a catalyst for $H_2$ formation. Further, during charging at the second electrode 220, the following reaction may take place: $Ni(OH)_2+OH^- \Rightarrow NiOOH+H_2O+e^-$ (+0.49 V vs. SHE), followed by $4\,OH^- \Rightarrow O_2+2\,H_2O+4e^-$ (0.40 vs. SHE). When the battery is charged, the NiOOH acts as $O_2$ evolution catalyst with some overpotential with respect to the $O_2$ evolution equilibrium potential.

FIG. 1a shows electrolysis reactions. When the arrows are reversed, discharge reactions are indicated. Hence, the open cell potential (for discharging) is 1.37 V. The equilibrium potential for electrolysis is 1.23 V; however, for having significant $O_2$ and $H_2$ evolution overpotentials are required with respect to the equilibrium potentials. In addition the thermo neutral potential for splitting water is 1.48V, taking into account also heat that is required if that is to be generated only from the applied potential during electrolysis. In the present invention, however, heat is also available from the overpotentials of the battery charging, which provides some additional heat. In practice during electrolysis the potential rises to at least 1.55-1.75 V. Heat from overpotentials is therfore available for the electrolysis. A remarkable fact is that the battery can be charged first although the potential energy levels are very close to the $H_2$ and $O_2$ evolution potentials.

FIG. 1b schematically depicts an embodiment of the energy apparatus 1 having an electrical energy storage functionality and an electrolysis functionality. The system 1 comprising the functional unit 2 (see also above). The first cell 100 comprises a first cell electrode 120 and one or more first cell openings 110 for a first cell aqueous liquid 11 and for a first cell gas 12. The second cell 200 comprises a second cell electrode 220 and one or more second cell openings 210 for a second cell aqueous liquid 21 and for a second cell gas 22, wherein the second electrode 220 comprises a nickel based electrode.

Further, a first electrical connection 51 in electrical connection with the first cell electrode 120, and a second electrical connection 52 in electrical connection with the second cell electrode 220, are depicted. These may be used to provide electrical contact of the electrodes 120,220 with the external of the unit 2.

The energy apparatus 1 further comprises an aqueous liquid control system 60 configured to control introduction of one or more of the first cell aqueous liquid 11 and the second cell aqueous liquid 21 into the functional unit 2. The liquid control system 60 by way of example comprises a first liquid control system 60a and a second liquid control system 60b. The former is functionally connected with a first inlet 110a of the first cell 100; the latter is functionally connected with a first inlet 210a of the second cell 200. The aqueous liquid control system 60 may include recirculation of the aqueous liquid (and also supply with fresh aqueous liquid (not shown in detail)).

Yet further, the apparatus 1 comprises a storage system 70 configured to store one or more of the first cell gas 12 and the second cell gas 22 external from said functional unit 2.

The storage by way of example comprises a first storage 70a and a second storage 70b. the former is functionally connected to a first outlet 110b of the first cell 100; the latter is functionally connected to a first outlet 210b of the second cell 200. Note that e.g. only the first storage 70a may be available, i.e. a storage for hydrogen gas. Separation between gas and liquid, upstream of the storage and/or downstream from the first cell 100 or the second cell 200 may be executed with a $H_2$ valve and/or a $H_2O$ dryer and an $O_2$ deoxidiser as they are known in the art, or with a $O_2$ valve and/or a $H_2O/H_2$ condenser, respectively.

The energy apparatus 1 further comprises a pressure system 300 configured to control one or more of a the pressure of the first cell gas 12 in the functional unit 2, b the pressure of the first cell gas 12 in the storage system 70, c the pressure of the second cell gas 22 in the functional unit 2, and d the pressure of the second cell gas 22 in the storage system 70. The pressure system may e.g. include different pressure systems, which may be independent from each other or may be connected. By way of example a first pressure system 300a is depicted, especially configured to provide one or more of the first liquid 11 and the second liquid 21 under pressure to the first cell 100 and second cell 200, respectively. Further, another pressure system 300b may be configured to control the pressure of the storage for the first gas 12. Yet, another pressure system 300c may be configured to control a pressure of the storage for the second gas 22. Further, the pressure system 300 may be configured to control the pressure in the first cell 100 and/or second cell 200. To this end, the pressure system may include one or more pumps, one or more valves, etc.

Yet, the apparatus in this embodiment also comprises a charge control unit 400 configured to receive electrical power from an external electrical power source (reference 910, see further below) and configured to provide said electrical power to said functional unit 2 during at least part of a charging time at a potential difference between the first cell electrode 120 and the second cell electrode 220 of especially more than 1.37 V during the first battery charge and larger than 1.48V and up to 2.0V during electrolysis when the battery is already fully charged.

Schematically depicted are also a first connector unit 510 for functionally coupling a device 930 to be electrically powered and the electrical connection 51,52, as well as a second connector unit 520 for functionally connecting a device to be provided with one or more of the first cell gas 12 and the second cell gas 22 with said storage system 70. Here, in fact two second connectors 520 are depicted, a first second connector 520a, functionally connected with the first storage 70a, and a second second connector 520b, functionally connected with the second storage 70b.

The apparatus may be controlled by a control system 80, which may be especially configured to control at least one of the aqueous liquid control system 60, the storage system 70, the pressure system 300, and the charge control unit 400, and especially all of these.

FIG. 1b also schematically depicts an embodiment of an energy system 5 comprising the energy apparatus 1 and an external power source 910, here by way of example comprising a wind turbine and a photovoltaic electricity generation source. The apparatus 1 or energy system 5 may be used for providing one or more of electrical power, hydrogen ($H_2$) to device 930, such as a motorized vehicle comprising an engine deriving its propulsion energy from one or more of a hydrogen source and an electrical power source. Alternatively or additionally, apparatus 1 or energy system 5 may be used by an industrial object 940, comprising such device

930. Here by way of example, the industrial object uses $O_2$ for e.g. a chemical process. Hence, of course alternative or additionally, first storage 70a may also be functionally coupled to a gas grid; likewise second storage 70b may functionally be coupled to a gas grid.

FIG. 1b also indicates a return system for aqueous liquid (see also above).

FIGS. 1c-1d schematically depict embodiments wherein the apparatus 1 comprises a plurality of functional units 2, either arranged parallel (1c) or in series (1d). Also combinations of parallel and in series arrangements may be applied. Referring to FIG. 1c, wherein the units 2 are configured parallel, the units 2 may be configured in a single bath comprising the electrolyte (i.e. water comprising especially KOH), thus without a separator 4. Referring to FIG. 1d, wherein the units 2 are configured in series, it may be necessary to introduce a separator 4. This separator 4 may for instance comprise a bipolar plate, such as a nickel-coated bipolar plate. The electrolyte may contain e.g. at least 5M KOH, such as about 6 M KOH. Though separators 30 may separate the first cell 100 and second cell 200, in embodiments the electrolyte may flow from the first cell to the second cell, or vice versa, or from a first cell of a first functional unit to second cell of a second functional unit, or vice versa, etc.

An advantage of arranging the units 2 in series is that application of the electrical connections is much easier. For instance, when using bipolar plates configured between units, one may only need a first electrical connection 51 with a first cell electrode (not depicted) of first cell 100 of a first unit 2, and a second electrical connection 52 with a second cell electrode (not depicted) of second cell 100 of a last unit 2. Current may then travel through a bipolar plate 4 from one (electrode from one) unit 2 to another (electrode from another) unit 2 (see arrow through bipolar plate 4). A further advantage of the series arrangement is that battery management may be easier than in the case of parallel, as providing charge beyond full capacity of one of the cells results in the (desired) generation of $H_2$ somewhat earlier than in the other cells, without adverse effects. Discharge beyond the full capacity of an individual cell the voltage drop can be monitored not to go below 1.1V per individual cell and also $O_2$ can be made available for reduction in the electrolyte at the Ni based electrode, e.g. by inserting $O_2$ from the bottom water entrance of the cell, bubbling and diffusing into the electrode. The $O_2$ can be produced and stored during the preceding charge periods of the device.

The plurality of functional units may be configured as stacks. Especially referring to the stack in series, a construction may be provided comprising [ABACADAE]n, wherein A refers to an electrolyte and dissolved gas distribution sheet (such as shaped porous propylene), B refers to the first electrode or the second electrode, C refers to a bi-polar plate, such as a Ni-coated bipolar plate, D refers to the second or the first electrode (with B≠D), E refers to a gas separation membrane, and n refers to an integer of 1 or larger. Note that equally well the stack may be defined as [CADAEABA]n or [ADAEABAC]n, etc. The whole stack may be contained in a pressure containment.

Figure 1E:
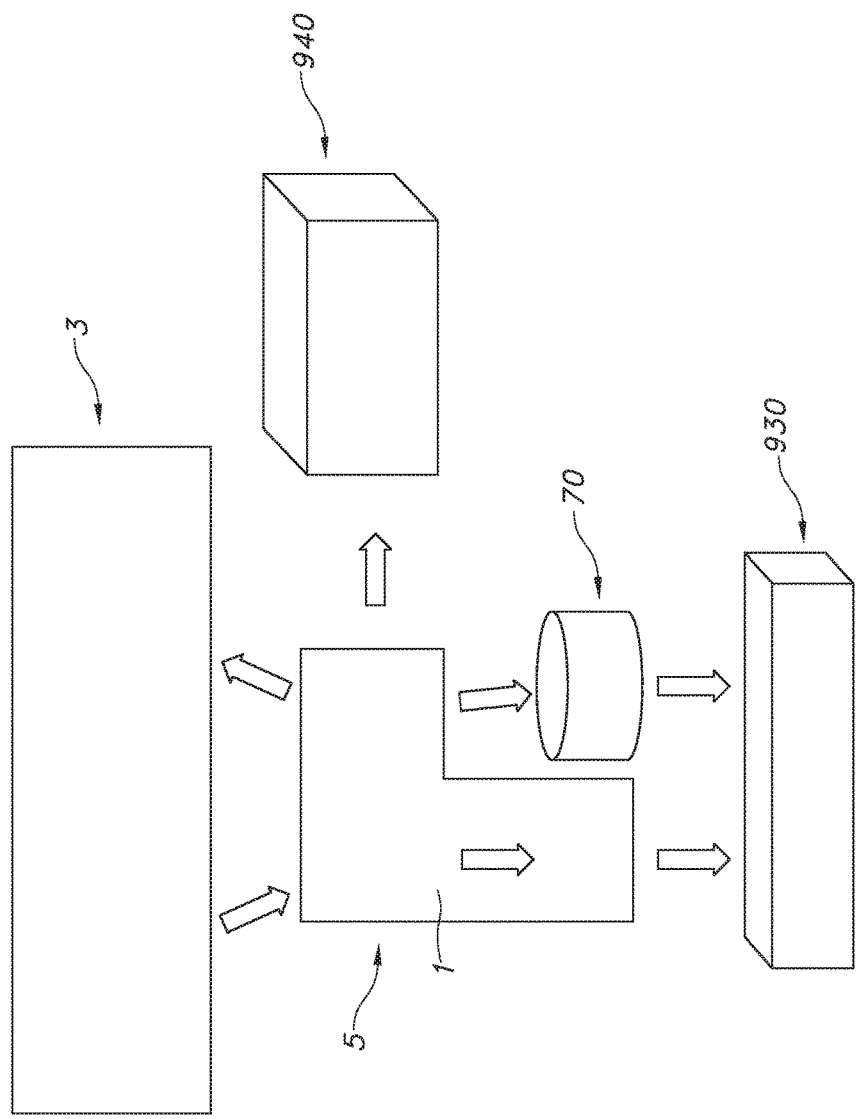

FIG. 1e schematically depicts an embodiment of an energy system 5, with an electricity grid 3, which may provide varying electricity and/or demand electricity. Electricity may be stored, indicated with $e^-$ and also one or more of $H_2$ and $O_2$ may be stored, especially at least $H_2$. This may be consumed by e.g. an industrial object 940, which may especially use $H_2$. Further, this may be used by e.g. a device 930, such as a motorized vehicle, configured to be powered by one or more of $H_2$ and electricity. Of course, one or more of $H_2$ and $O_2$ may also be transported via a (gas) grid.

If desired, part of the $O_2$ may also be reintroduced into the functional unit (during discharge)(into the second cell).

EXPERIMENTAL

Three functional units were built. These consisted of 4 $Ni(OH)_2$ based electrodes electrically connected parallel to each other as the positive pole, with also electrically parallel connected 3 $Fe(OH)_2$ based electrodes in between the 4 Ni electrodes as the negative pole. Each electrode is made with the active material in nickel plated steel pockets with small perforations to allow the electrolyte entrance and gas release. The surface area is 30 mm×100 mm, and the complete electrode thickness 3 mm. In between the Ni and Fe electrodes the Zirfon separator is present to separate the produced gasses and to electrically separate the electrodes. The electrical insulation of the contacts is performed using polyethylene parts.

The results obtained were nearly identical for each of these three functional units. The following was realized in a ~13 Ah battery capacity battery electrolyser:

Potential during 13 Ah battery charge ~mostly around 1.52V (overpotential 1.52−1.37=0.15V, efficiency ~1.37/1.52=0.90)

Potential during 13 Ah discharge: mostly around 1.2V (overpotential 1.37-1.2=0.17V, efficiency ~1.2/1.37=0.88)

Battery part efficiency=0.90×0.88=0.79.

Potential during 10 Ah $H_2$ production: 1.65V (overpotential 1.65-1.48=0.17V, efficiency ~0.90)

Overall efficiency: (13 Ah×1.2+10 Ah×1.48)/(13 Ah×1.52+10 Ah×1.65V)=0.838

(assuming that the stored $H_2$ has its full HHV=1.48 eV/H atom)

As separator, Zirfon Perl UTP 500 (Agfa) was used. Features of Zirfon Perl UTP 500 are: Permanently hydrophilic by incorporated metal oxide particles, perfectly wettable in water and most common electrolytes; No hydrophylization by surfactants needed; Lots of OH-groups at alkaline pH due to amphoteric character of $ZrO_2$; Dimensionally stable (no shrinkage effects); Very robust (reinforced with a fabric); Stable in strong alkaline (up to 6M KOH) and up to 110° C.; Low ionic resistance, enables electrolysis at high current densities; 0.3 Ω·cm² (at 30° C., in 30 wt. % KOH); Gas pressure resistance can be up to 200 bar when filled up with electrolyte; Symmetrical internal pore structure; Porosity 50±10%; Double safety by double skin layer; Pore size 0.15±0.05 μm; and Thickness 500±50 μm.

The amount of hydrogen (and oxygen) produced adds up to the total weight of water lost during $H_2$ production: this indicates no other side reactions are detected.

Figure 2A:
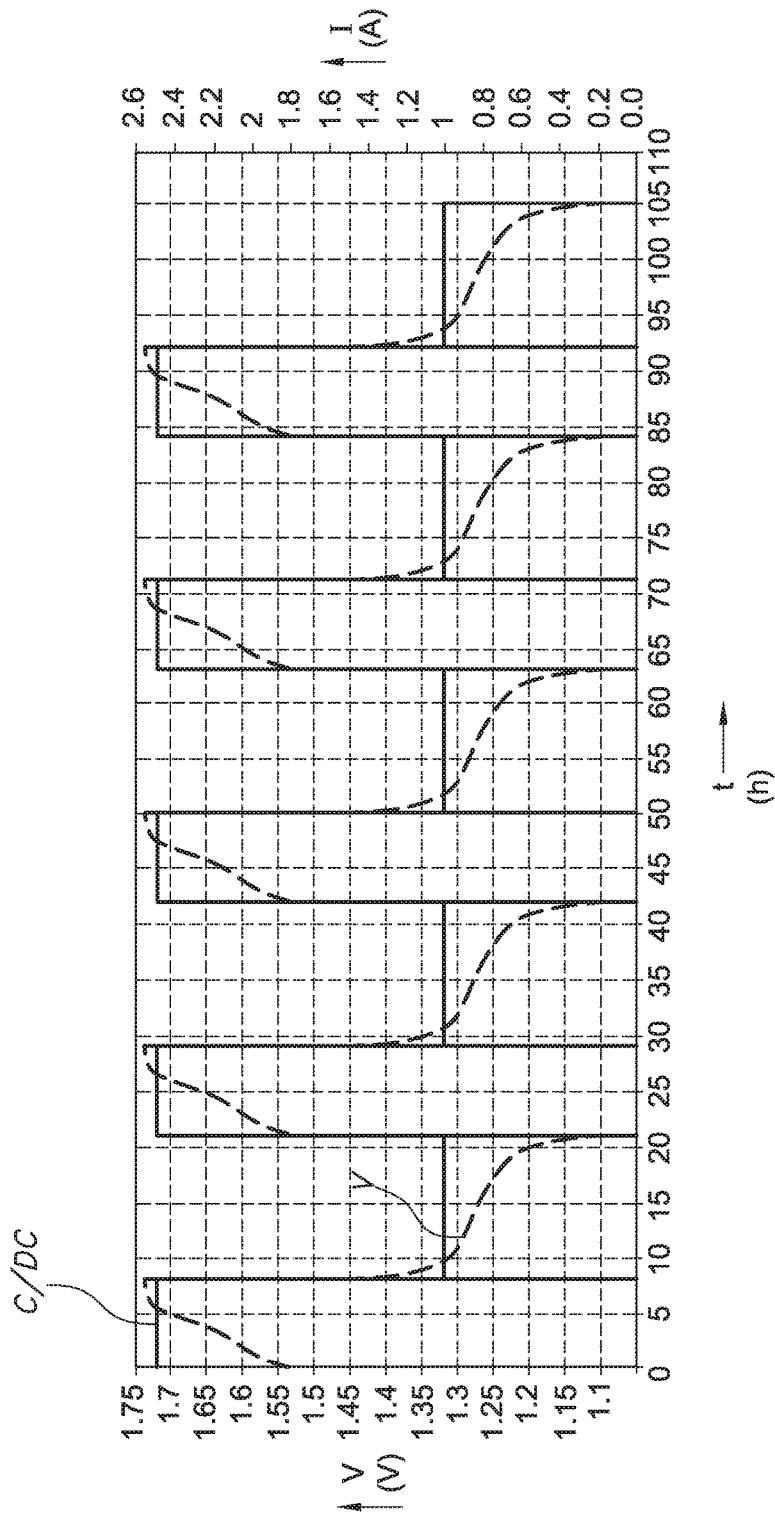
FIGS. 2a-2b show some experimental results.

FIG. 2a shows five representative cycles for using the hybrid battery-electrolyser. The C/DC curve indicates the charge and discharge current (absolute values) (I-curve, solid line); the V-curve (dashed lines) shows the resulting voltage. One can observe the following (from left to right): first ~4 hours: the applied current of 2.5 A is inserted in the device at a voltage between ~1.54 and 1.65V, resulting in mostly charging of the battery electrodes, measurements show there is only ~10% of the current converted into hydrogen production during this time. From hour ~4-8 there is hydrogen production while the voltage increases to <1.75V. Subsequently the current is reversed at a level of 1 A, resulting in discharge of the battery at voltages between ~1.4 and ~1.15V. Subsequently four cycles show the stability of the device and identical patterns. On the left y-axis the voltage in volt is indicated; on the right y-axis the current in ampere is indicated.

Figure 2B:
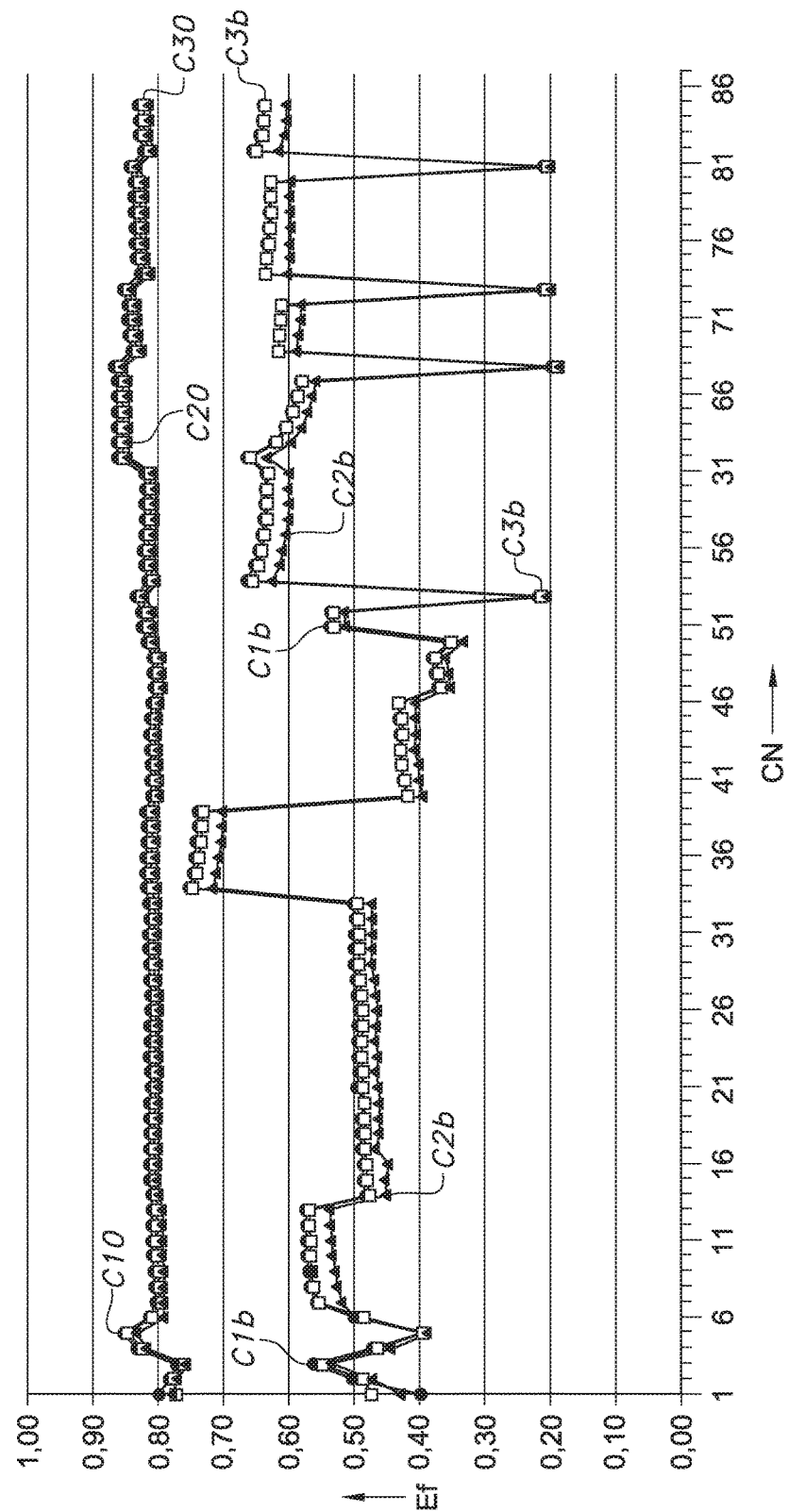

FIG. 2b shows the Ni—Fe battery discharge capacity and coulombic efficiency (on a scale of 0-1, or in fact 0.4-0.9) for three different Ni—Fe electrolyser-battery cells during different types of cycles, with different ratio's of battery storage to overall battery+hydrogen energy storage. Overall efficiency is the ratio of the battery discharge energy in Wh plus the Higher Heating Value (HHV) of the produced hydrogen gas divided by Wh inserted in the battery. The Battery efficiency considers only the electrical output in Wh of the battery divided by the total Wh inserted electrically in the device.

The overall efficiency is defined as the energy in the higher heating value of the hydrogen generated plus the electrical energy stored in the battery divided by the total input of electrical power. The battery efficiency is calculated from the average electrical output potential of the reversible battery capacity divided by the average input potential starting from the discharged state (so including the hydrogen generation). Remarkably the overall efficiency reaches >80%, which is higher than the Ni—Fe battery alone reaches (~70%) because now the hydrogen losses during battery charge are captured. The efficiency of a single alkaline electrolyser is also about 65-70%, so here too a benefit in higher electrolysis efficiency is found (due to lower required potentials in the battery electrolyser). The indications C1O, C2O and C3O indicate the overall efficiency cell results for the cells 1-3; the indications C1B, C2B and C3B indicate the battery efficiency for the three different cells.

During cycles 33-38, only a low amount of gas was made; i.e. in total less charge input, and a relative large fraction of the charge was therefore stored in the battery. During cycles 61-67, the temperatures is 40° C. there, a higher overall efficiency is found. Five cycles thereafter, the temperature is 35° C., and 8 cycles thereafter, the temperature is 30° C. For cycles with a battery efficiency indicated as about 20%, the battery was fully charged and in addition about four times more $H_2$ was produced than there is capacity in the battery.

Overpotentials for hydrogen and oxygen production were determined at different battery-electrolyser applied currents, after the battery capacity was reached fully. For currents between 0.1 A and 4 A in the test cells there is a linear relation between the required Voltage and the $^{10}$log of the current. The slope corresponds to about 155 mV per decade in current increase at 20° C. Lower overpotentials were realised at 40° C. due to lower internal resistances and faster kinetics, this corresponds to a further overall efficiency increase to ~86%.

Many more cycles were performed on three different cells, with different charge rates, total amounts of current and also with switching the charge and discharge each 15 minute. Overall efficiencies remained high above 81% also during switching, and in fact because the overpotential of charge and discharge of the battery functionality were smaller (possibly due to diminishing gradients in $OH^-$ concentration in the electrolyte) the efficiency increased slightly during switching.

Figure 3A:
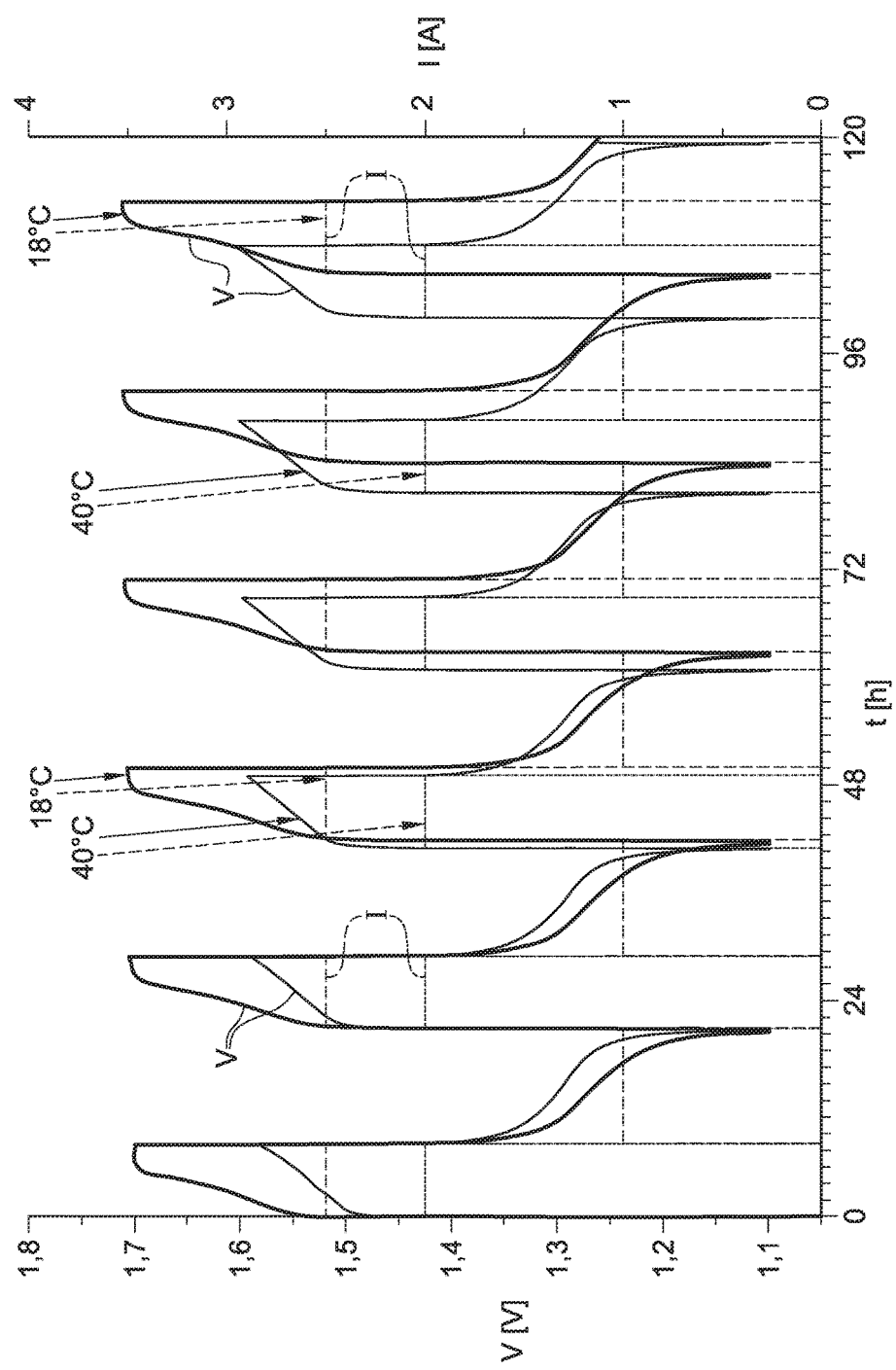
FIG. 3a-3d show some further experimental results.

FIG. 3a shows several cycles showing the cell voltages during 20 Ah charge plus hydrogen generation (with 2.5 A current, grey lines) and ~12.6 Ah discharge (1 A current) performed at 18° C. In the same graph also cycles performed at 40° C. are shown with 16 Ah charge plus hydrogen generation (current 2.0 A) and ~12.6 A discharge (current 1.0 A).

Figure 3B:
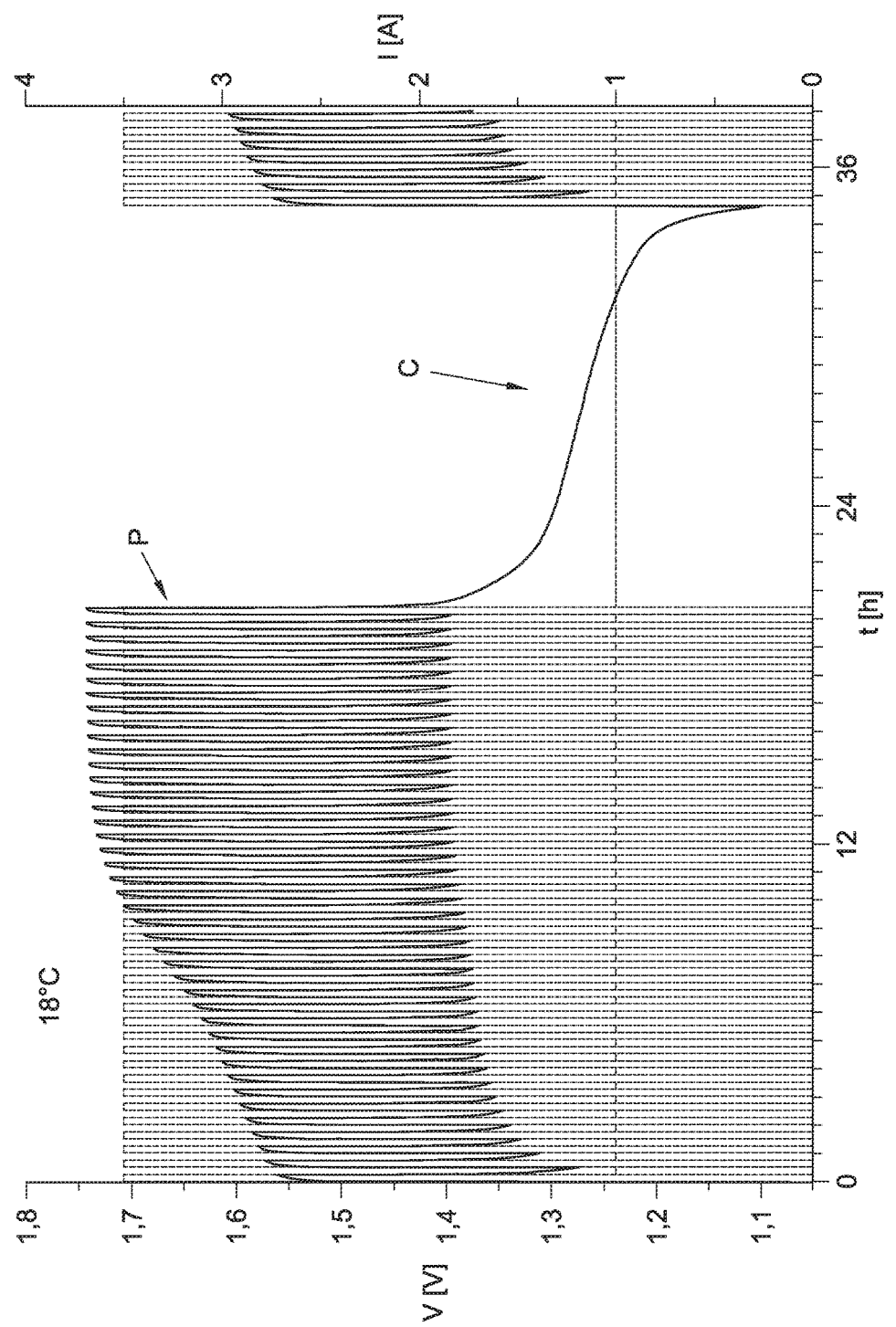

FIG. 3b shows a test with rapidly varying charging loads: pulsed insertion of charge with a current of 3.5 A, alternated with 1 A discharge, during 15 minutes. Total charge inserted: 25 Ah. Subsequently a full discharge at 1 A delivering ~14.4 Ah is obtained during about 15 minutes. The difference is almost fully converted to hydrogen (and oxygen). Note that the discharge voltages during the short pulses remain relatively high compared to the subsequent continuous discharge; this indicates a that such switching is possible at high electrical efficiency for charge and discharge, while still filling the battery capacity and generating hydrogen. (currents indicated with the dashed line, voltages are indicated with P (pulsed: 15 minutes: 4 A charge+H2; 1 A discharge); C indicates the continuous discharge at 1 A. Hence, the apparatus can be charged and discharged intermittently with quickly alternating charge/discharge periods. This may also imply that taking current from or providing current to a grid can be done very fast when demanded. Such switching capabilities were also tested at 4 A charge, 2 A discharge pulses for these devices.

Figure 3C:
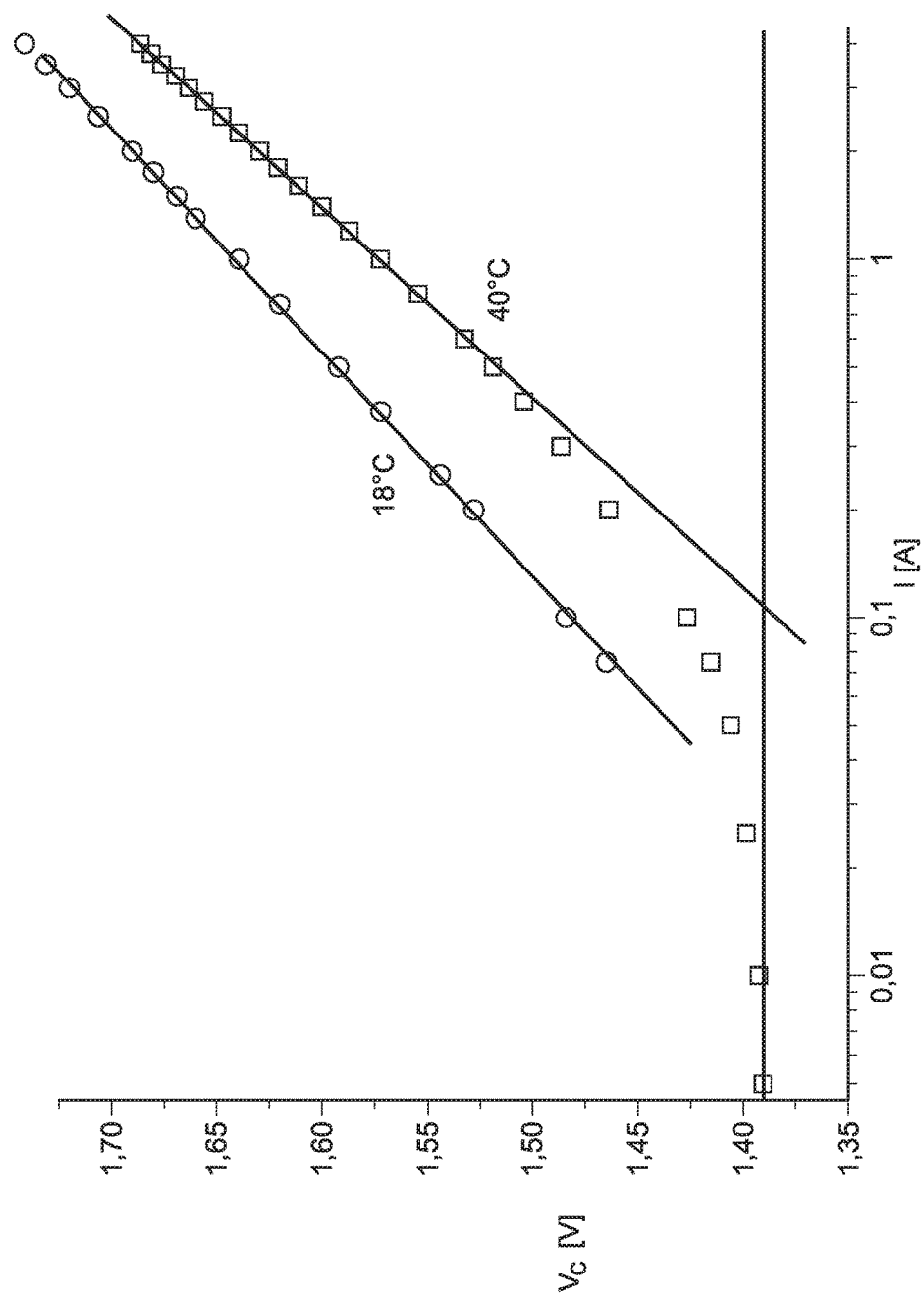

FIG. 3c shows cell voltages (Vc) of a charged battery electrolyser cell during hydrogen generation at different applied currents and at 18 and 40° C. At the higher temperature the potentials required to maintain the current are lower, indicating lower overpotentials and higher efficiency for the $H_2$ generation. The thermo neutral potential for water splitting is 1.48V; at 4 A and 40° C. an electrolytical efficiency can thus be realised of 1.48/1.68=0.96.

Figure 3D:
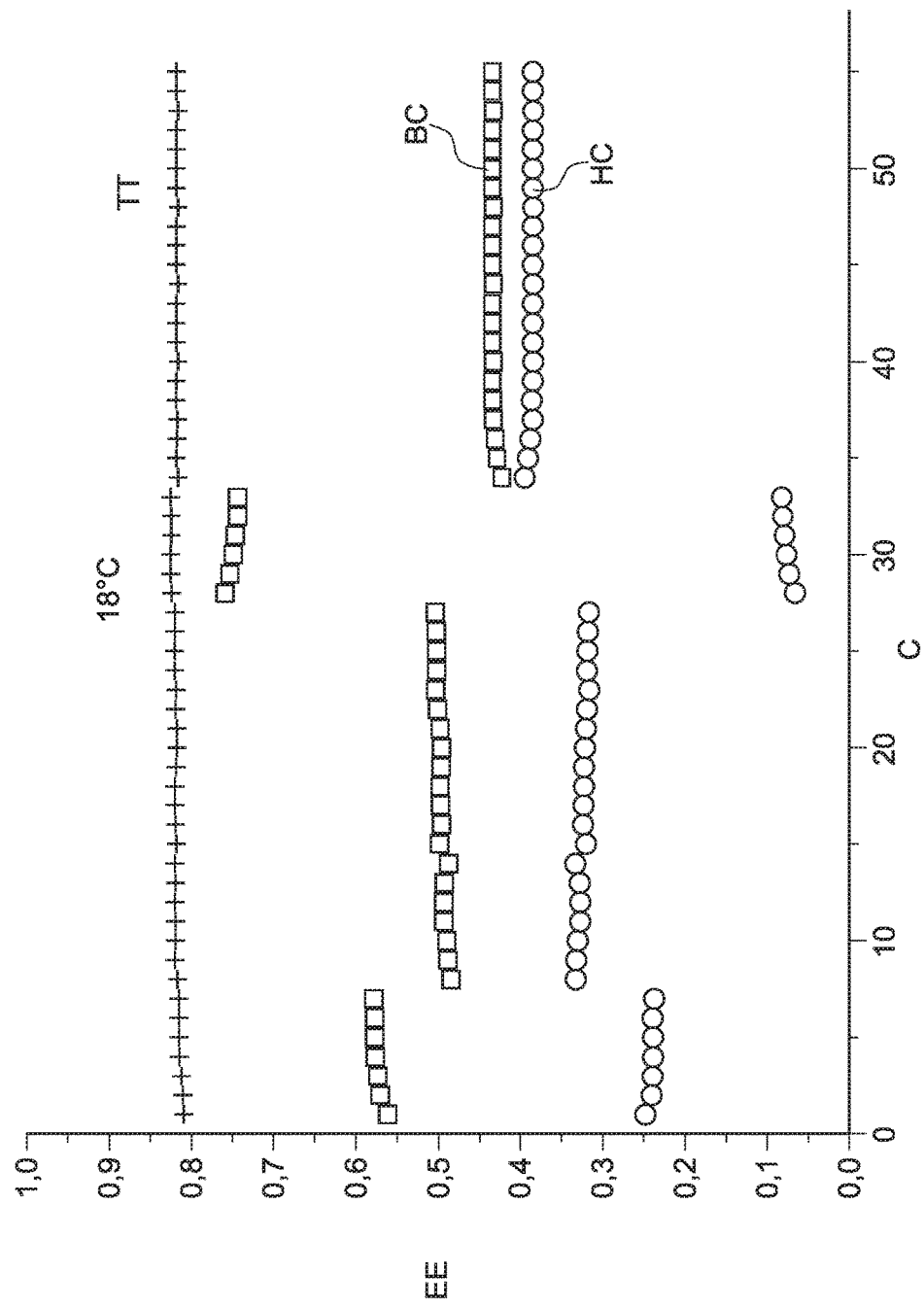

FIG. 3d shows the energy efficiency (EE) defined as the total stored energy (TT) in hydrogen gas and in the battery divided by the total electrical energy input of a single ~10 Ah cell. Each cycle (C) was performed with charge/hydrogen generation potentials below 1.75V, and discharges down to 1.1V. The differences result from different levels of battery charge compared to hydrogen production. (plus: total efficiency, square: battery contribution to the energy stored, circle: hydrogen contribution). Reference T indicates the total contribution. The squares indicate the battery contribution (BC) and the circles indicate the $H_2$ contribution (HC).

Hence, the invention provides electricity storage with an integrated alkaline Ni—Fe battery and electrolyser ("battolyser"). We have developed an integrated nickel-iron battery-electrolyser ("battolyser") that combines the durability of Ni—Fe batteries and alkaline electrolysis, while their integration leads to higher efficiency. When charged the battery electrodes consisting of nanostructured NiOOH and reduced Fe act as efficient oxygen and hydrogen evolution catalysts respectively, enabling current insertion without degradation far beyond the battery capacity. Furthermore, our results demonstrate a remarkable constant high efficiency and fast current switching capabilities in the integrated device. We anticipate the result to be a starting point for an efficient robust grid scale energy storage solution with a low cost, abundant element based, intrinsically flexible device that has close to full time applicability: as unlimited switchable power storage and hydrogen fuel and feedstock producer.

In a renewable energy future similar daily volumes of electricity storage in batteries[3] and in the production of hydrogen fuels may be required to come to adequate energy storage on both daily, and seasonal timescales. We show here that the integration of the Ni—Fe battery and the alkaline electrolyser leads to a device concept as sketched in FIG. 1. Short term variation in renewable power is stabilised using the battery while the hydrogen production enables long-term energy storage and 'greening' of chemical processes such as the Haber-Bosch ($NH_3$ from $N_2$ and $H_2$), Sabatier ($CH_4$ from $H_2$ and $CO_2$), and Fischer-Tropsch (alkanes from $CO/CO_2$ and $H_2$) process.

First, the integrated battolyser device is based on the Ni—Fe battery as introduced by Jungner and Edison. The Ni—Fe battery is known for its robustness during intensive deep discharges and overcharging, and its extreme longevity. The battery has a negative electrode in which $Fe(OH)_2$ is reduced to Fe upon charge: $Fe(OH)_2+2e^-\rightarrow Fe+2OH^-$ (−0.877V vs SHE), considering only the $Fe/Fe^{2+}$ discharge plateau. The positive electrode contains $Ni(OH)_2$ that upon charge releases a proton: $Ni(OH)_2+OH^-\rightarrow NiOOH+H_2O+e^-$ (+0.49V vs SHE). The open circuit potential (OCV) of the battery is 1.37V, which is higher than the minimum potential required to split water from the aqueous electrolyte. Ni—Fe batteries have been known for their relatively low energy efficiency (~50-70%)[7,5], their limited charge rate capabilities, and an historically reduced market potential as a result of that. In the battolyser, however, hydrogen becomes a regular product of operation improving the energy efficiency and enabling that higher charging rates with higher overpotentials and (higher) associated gas evolution can be used.

Second, the battolyser is based on alkaline electrolysers; mature technologies at industrial scales for the generation of hydrogen and oxygen at a typical efficiency of 71% that is calculated from the higher heating value (HHV) of the produced hydrogen divided by the applied electrical energy. At the positive electrode the oxygen generation takes place: $4OH^-\rightarrow O_2(g)+2H_2O+4e^-$ (1.23-0.059×pH vs SHE) and at the negative electrode hydrogen generation: $2H_2O+2e^-\rightarrow H_2(g)+2OH^-$ (0.00-0.059×pH vs SHE). The main active components are a Ni metal based positive electrode, a Ni (or Ni coated Fe) negative electrode, and a gas separator or diaphragm with alkaline electrolyte in between. The diaphragm separates the hydrogen from oxygen while transmitting the $OH^-$ ions between the electrodes. In the normal electrolyser hydrogen production at currents of 400 $mA/cm^2$ electrode surface and typical temperatures of 65-150° C. are required and precious metals like Pt or Pt—Ru can be incorporated in the negative electrode to come to high enough efficiency and production levels. The diaphragm can be a ceramic polymer composite, while the electrolyte is again a strongly alkaline KOH solution.

In the battolyser for the first time the clear synergy of materials choices of the durable Ni—Fe battery electrodes and the alkaline electrolyser are explored. For separation of hydrogen and oxygen the battolyser has a commercial diaphragm as used in alkaline electrolysers, which is known for its low resistance for ionic transport and stability up to 110° C. (Zirfon-Perl-UTP500). The battolyser is operated near room temperature and with currents matching the battery active mass and surface area, reaching up to 20 $mA/cm^2$. These same moderate currents split water efficiently at higher states of charge, without any precious metal catalysts and near RT. The moderate conditions will mean prolonged lifetime for all components.

Hence, in embodiments during charge the Ni—Fe electrodes stores electricity from the electricity source, converting the electrode materials ($Fe(OH)_2+2e^-\rightarrow Fe+2OH$) and $Ni(OH)_2+OH^-\rightarrow NiOOH+H_2O+e^-$, and when charged generate hydrogen ($2H_2O+2e^-\rightarrow H_2(g)+2OH^-$) and oxygen ($4OH^-\rightarrow O_2(g)+2H_2O+4e^-$) by splitting water. The diaphragm transmits $OH^-$ and separates $O_2$ and $H_2$. The battolyser may be applied as sink and source for stabilising the electricity grid, for supplying electricity as well as $H_2$ as fuel, and for $H_2$ as chemical feedstock.

Figure 4:
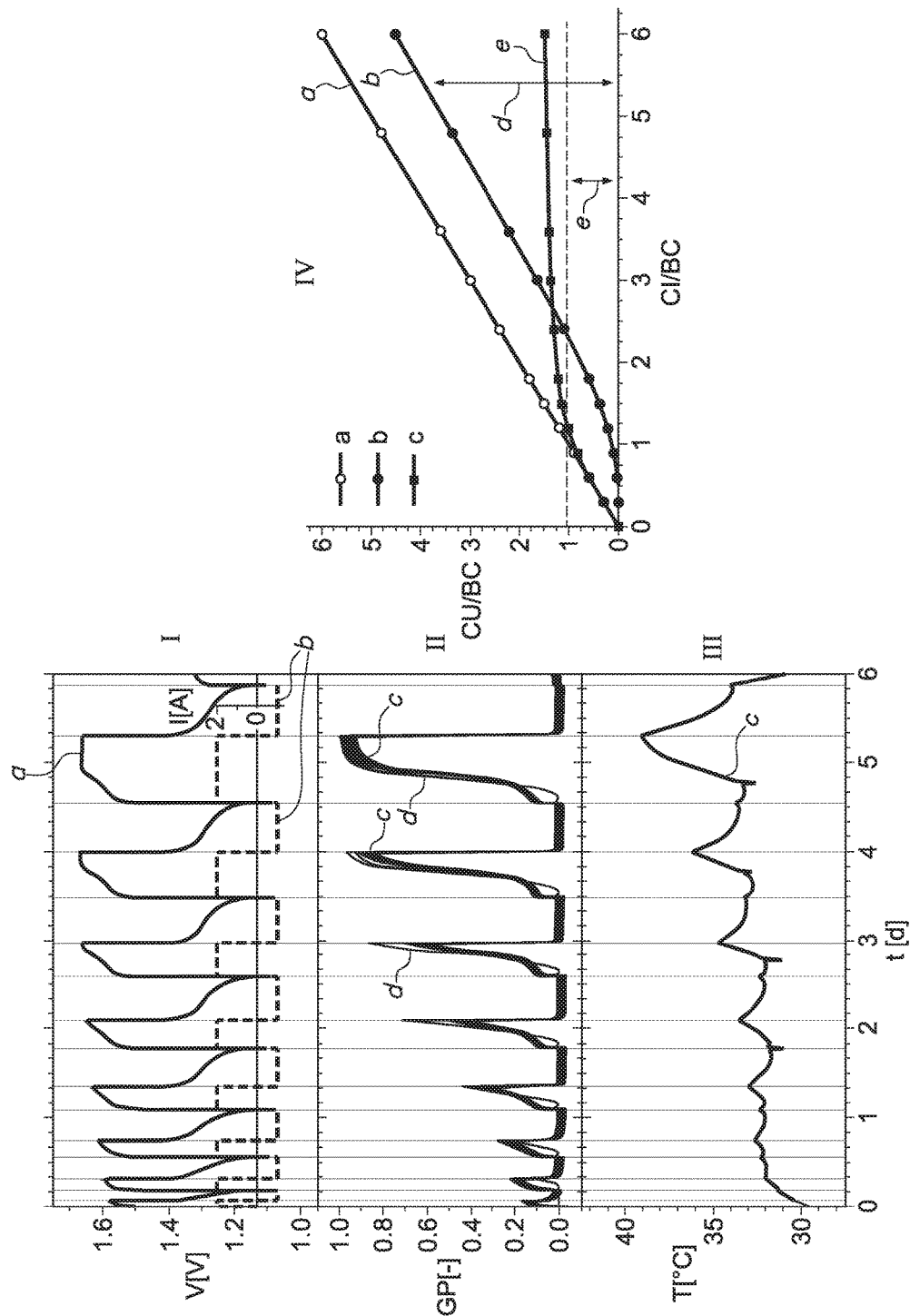
FIG. 4.

In FIG. 4 the flexible storage capacity provided by the battolyser is shown for cycles with increasing charge insertion. Indeed the increasing duration of electrical current insertion leads to increasing battery electrode charging, and when fully charged, increasing electrolytic gas production. The charge insertion period is each time followed by a full discharge of the battery electrodes, showing the battery reversibility after prolonged charge and water splitting. Hydrogen evolution starts immediately at small rates whereas no oxygen evolution is detected until charge insertion of 0.25 C (C is the nominal reversible battery discharge capacity of 10 Ah). It can further be observed that oxygen evolution catches up and surpasses hydrogen evolution at 0.75 C. Overall, stoichiometric gas evolution takes place. During discharge a fast decrease of gas evolution to zero is observed. Interestingly the gas evolution is not constant during electrolysis. We attribute this to the increasing device temperature which promotes electrolysis and self-discharge, both leading to increased gas yield (and reduced discharge capacity).

Figure 5:
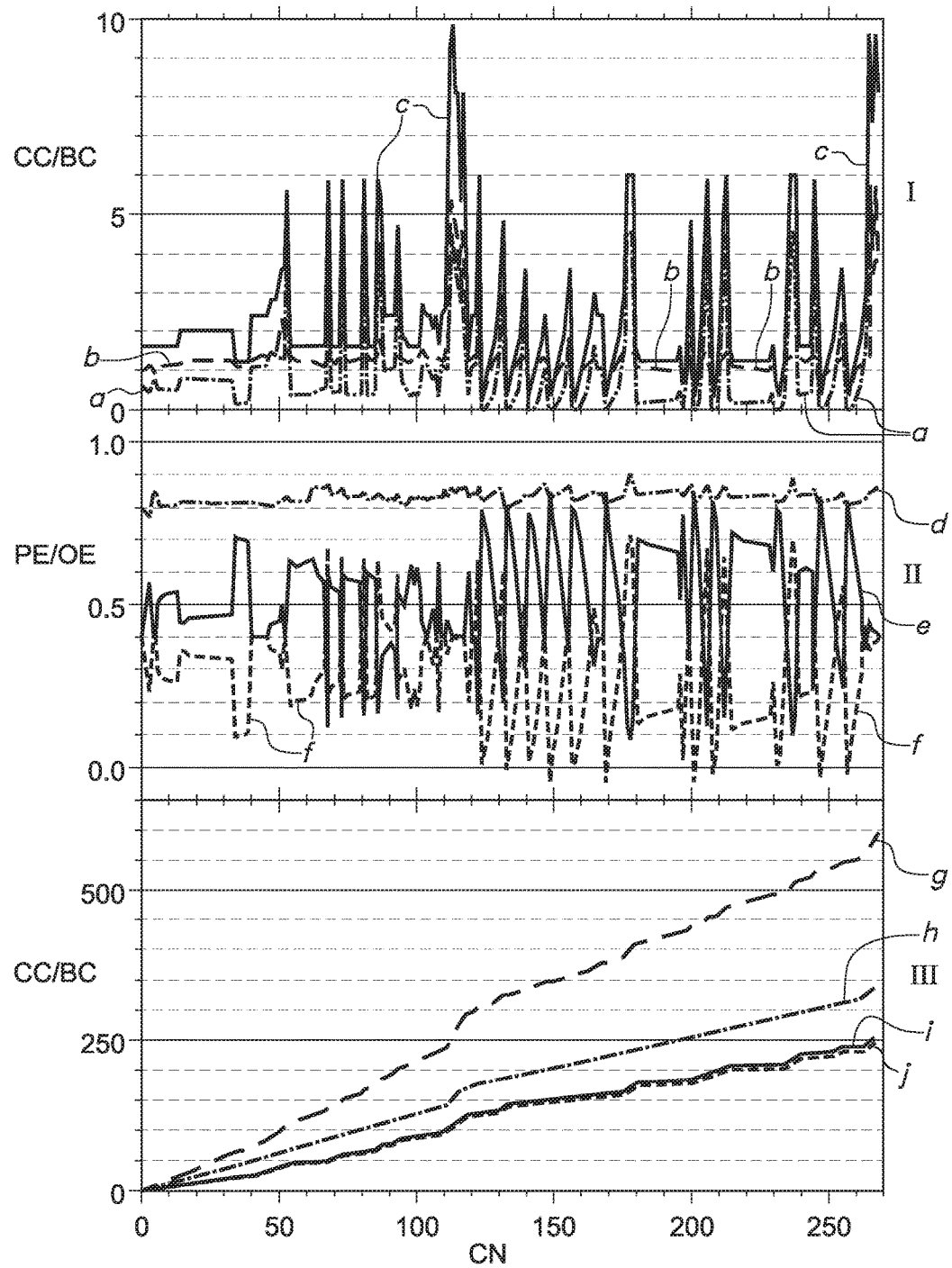

We designed a test-series to simulate various real life situations with partial and full (dis)charging, rapid switching, continuous overcharging, as well as the around the clock cycling for months ( ). The results are shown in FIG. 5. The battery capacity is not harmed by the many cycles that included overcharges up to 6 times the nominal capacity, nor by the deep discharges at the end of each cycle. This shows the very robust nature of the device. Experiments were performed in three separate cells and prove to be fully reproducible between cells. During the test period of 10 months the cell consumed 823.4 g of water, where 795.2 g (96.6%) is expected due to electrolysis, the remainder is lost by water evaporation through the exhaust valves together with the gas release. Other side reactions leading to more weight loss are not observed in trace gas analysis. The cells still operate with the initial electrolyte, only water was added, so no renewal of electrolyte took place.

The remarkable finding in FIG. 5 (middle (II)) is the overall stability of the energetic efficiency (energy stored in battery plus hydrogen divided by energy input, see below) at 80-90% over many different types of cycles, and also the stability of the reversible discharge capacities of the battery. This finding is in line with the very robust track record of both Ni—Fe batteries and alkaline electrolysers, but has never been reported before for an integrated battery-electrolyser to our knowledge.

The electrolysis potential as a function of current and temperature is shown in FIG. 6. Higher temperatures lead to lower ionic resistance and potential, increasing efficiency. The potential increases about 140 mV for a factor 10 higher current; this is a similar increase as observed for advanced alkaline electrolysers at low ~20 $mA/cm^2$ current density. We limited the test temperature to 40° C. preventing potential long term reduced stability issues of the iron electrode. At the lowest currents, potentials below the thermoneutral potential of 1.48V, but above the open circuit potential of 1.37V of the Ni—Fe battery are reached.

As a further test of the operation of the battolyser we applied various rapidly changing charge—discharge cycles (FIGS. 6a and 7). Such test may mimic the application as a peak shaving battery and electrolyser that experiences a varying renewable electricity input (charge/electrolysis peak) interspaced with electricity demand when the renewable electricity has shortages (discharge peak). As can be seen in the FIG. 6a the battery and gas production functionalities of the cell follow the applied current changes and reversals directly without delay, which is an asset compared to e.g. conventional electrolysers. Most remarkably the average potentials during charge and discharge come closer together, which means a higher electrical efficiency $\eta_{battery}$ during these rapidly varying currents; i.e. no adverse effects of switching but rather a positive effect.

The findings of durability and flexibility are remarkable since other types of batteries will be rapidly destroyed by overcharging and/or deep discharging. Lithium ion batteries suffer from electrolyte decomposition during overcharging, while nickel-metal hydride and lead-acid batteries suffer mainly from detrimental corrosion effects during overcharge and deep discharge. The remarkable stability will be related to the fact that the Ni and Fe based electrodes are operating between the thermodynamically stable phases in their Pourbaix diagrams. Apparently during the electrolysis mode at the negative electrode one can only reduce water to $H_2$ or reactivate iron oxides (when formed during deep discharge) to become Fe, while at the positive electrode any $Ni(OH)_2$ which is oxidised to NiOOH or overcharged to $\gamma$-NiOOH will readily go back to $Ni(OH)_2$ during discharge. Such intrinsic stable points of return during charge (Fe) or discharge ($Ni(OH)_2$) enhance the stability of the electrodes during prolonged electrolysis operation and deep discharge.

Next to the materials and energy efficiency the relevance of an integrated long living battery and electrolyser can be found in economic factors. The integrated battolyser fits in the merit order of using renewable electricity: $1^{st}$ using it directly, $2^{nd}$ storing the surplus in efficient batteries for the short time, and $3^{rd}$ storing it for longer times in hydrogen fuels at the expense of conversion losses when generating electricity afterwards. The integrated battolyser combines the $2^{nd}$ and $3^{rd}$ step in the merit order and in that way has as advantage that it reaches high capacity factors and efficiency, storing in the battery, producing gas, or delivering electricity.

In an example, an integrated battery electrolyser or battolyser was made. The electrodes are separated from each other using state of the art membranes (Zirfon from Agfa; ref Agfa Specialty Products (www.agfa.com); Vermeiren, P., Moreels, J. P., Claes, A. & Beckers, H. Electrode diaphragm electrode assembly for alkaline water electrolysers. International Journal of Hydrogen Energy 34, 9305-9315 (2009)) that have a low ionic resistance in the current density regime that is used, leading to an additional overpotential of 20-30 mV between the electrodes. The limited current density likely also means a prolonged lifetime of the membranes, which is subject of further tests.

We performed intensive charge insertion and withdrawal experiments, see FIG. 7. Constant current charge insertion to 6 times the battery capacity at various rates show stable electrolysis potential (FIG. 7a). Cycling of the charged electrode indicates the stability of the cell and the reproducibility of sub-cycles (FIG. 7b). Rapidly varying charge-discharge patterns are a test mimicking the application as a peak shaving battery and electrolyser that experiences a varying renewable electricity input (charge/electrolysis peak) interspaced with electricity demand when the renewable electricity is absent (discharge peak). As can be seen in FIG. 7c the battery functionality of the cell follows the applied currents directly without delay, which is an asset compared to—for example—conventional electrolysers. The battolyser acts both as instantly responding battery sink and source of current, while it generates gas during charge insertion. The charge insertion voltage is limited by the electrolysis as expected, but the discharge potential becomes higher at shorter discharge durations; up to about a gain of 0.25 V is present between the shortest discharges and prolonged continuous discharge. In for instance the inset of FIG. 7c the current insertion happens at 1.7 V while extraction occurs at ~1.55 V. This corresponds to a ~91% efficiency during such short charge/discharge periods, which is clearly favourable for e.g. grid operation purposes. Also continuous fast switching with 1000 short cycles was tested (FIG. 7d). All these experiments are included in FIG. 6 and have no detrimental effects on the performance of the device. As a cycle is counted from full discharge to full discharge with various full or partial (over/dis)charge programs in between the cycle discharge capacity can exceed the normal battery discharge capacity. The energy efficiency $\eta_{total}$ for each charge and electrolysis and subsequent discharge cycle is calculated from the equations:

$$\eta_{total} = \eta_{battery} + \eta_{electrolyser}$$

$$\eta_{battery} = \frac{\int_{t_c}^{t_c+t_{dc}} V_{dc} I_{dc}\, dt}{\int_0^{t_c} V_c I_c\, dt}; \eta_{electrolyser} = \frac{\int_0^{t_c+t_{dc}} H_{el} I_{el}\, dt}{\int_0^{t_c} V_c I_c\, dt};$$

$V_c$, $I_c$ are the applied cell voltage and current during the charge and electrolysis cycle with duration $t_c$, $V_{dc}$ and $I_{dc}$ are the discharge voltage and current during the discharge time $t_{dc}$, $I_{el}$ the current for electrolysis (and hydrogen evolution induced battery self-discharge) with an energy yield corresponding to the thermo neutral potential $H_{el}$. The $H_{el}$ equals 1.48 V at RT while $2eH_{el}$ equals the higher heating value of hydrogen of −286 kJ/mol $H_2$. $I_{el}$ results from the difference between the total current inserted in the battery electrolyser and the subsequent integrated current during discharge:

$$\int_0^{t_c} I_c\, dt = \int_0^{t_c+t_{dc}} I_{el}\, dt + \int_{t_c}^{t_c+t_{dc}} I_{dc}\, dt = C_{el} + C_{dc}$$

Note that the electrolysis yield also includes the gas production during (self) discharge (if any). Self-discharge is relevant since one can observe in FIG. 4a that during periods that there is no current running around 14 h test time, or the short waiting periods between 15 and 21 hours, there is some $H_2$ and $O_2$ gas production visible. Since there is no current running and $H_2$ and $O_2$ detected the possible self-discharge reactions will be $Fe+2H_2O \rightarrow Fe(OH)_2+H_2$ (g) at the Fe electrode and $2NiOOH+H_2O \rightarrow 2Ni(OH)_2+1/2O_2$ (g) at the Ni electrode. Such self-discharge does produce gas in the separate channels of the battolyser of which the energy content can be used, i.e. is not lost as in a battery. These self-discharge reactions may also play a (minor) role in the observed realisation of overall stoichiometric water splitting ($2H_2O \rightarrow 2H_2+O_2$) during the many hundreds of charge insertion, withdrawal and electrolysis cycles. In FIG. 5 results of different cycles are shown with the battery, electrolyser, and total efficiencies as well as the charge inserted in the battery charging and the electrolysis $C_{dc,el}$ divided by the nominal battery discharge capacity. The water amount added closely matches the amount expected for the overall water splitting.

The separate channels of hydrogen and oxygen were analysed during operation using a calibrated quantitative gas analysis system with a sensitive Hiden 3F-PIC series Quadrupolar Mass Spectrometer for the detection. There is hardly any detectible $O_2$ in the hydrogen channel, while there is a small amount of $H_2$ detected in the $O_2$ channel. This is more commonly observed in electrolysers. In view of the low ionic resistance of the membrane additional thickness can be afforded to increase the gas separation quality further where necessary.

In an embodiment, after charging the apparatus ("battery") and producing the reduced iron in the negative electrode, the aqueous liquid, especially at least the aqueous liquid in the first cell, may be at least partly, even more especially substantially entirely removed from the functional unit. This may prevent self-discharge via the reactions $Fe+2H_2O \rightarrow Fe(OH)_2+H_2(g)$ at the negative electrode and $2NiOOH+H_2O \rightarrow 2Ni(OH)_2+1/2O_2(g)$. Yet further, the functional unit, especially the first cell, may be filled with an inert gas, such as e.g. $N_2$. Hence, in embodiments the aqueous liquid control system 60 may also be configured to remove one or more of the first cell aqueous liquid 11 and the second cell aqueous liquid 21 from the functional unit 2. Yet further, the aqueous liquid control system 60 may also be configured to replace one or more of the first cell aqueous liquid 11 and the second cell aqueous liquid 21 from the functional unit 2 by an inert gas. Yet further, the aqueous liquid control system 60 may also be configured to replace the inert gas in one or more of the first cell and the second cell from the functional unit 2 by the first cell aqueous liquid 11 and the second cell aqueous liquid 21, respectively. Such embodiments, wherein e.g. temporarily the cell aqueous liquid is removed from the apparatus may especially be of relevance when the first electrode especially Fe comprising electrode has a larger active Fe mass (proportional to the current storage capacity expressed in [Ah]) than the second electrode, especially having a active mass at least twice as large, such as at least 10 times as large, even at least 50 times as large, as the active mass of the second electrode, such as even up to 150 times.

In yet a further embodiment, the one or more of the first cell aqueous liquid 11 and the second cell aqueous liquid 21 may further comprise a catalyst, especially a catalyst for generating water from $H_2$ and $O_2$. This may cure the problem of cross-over from gasses, which may not always completely be prevented by the separator. Especially, the second cell aqueous liquid 21 may comprise such catalyst. A suitable catalyst may e.g. be $LaNi_5$ or equivalently a modified $LaNi_5$ material as is used in nickel metal hydride batteries as anode. The catalyst may be provided as particles in a filter in the exhaust of the liquid or bound to the diaphragm (for the negative electrode compartment) or bound to the separating diaphragm (near the positive electrode, but not in electrical contact).

Alternatively or additionally, the separator may include a hollow separator with liquid within. For instance, a sandwich type of membrane may be provided between which an electrolyte may flow independently, taking away any crossed over $H_2$ or $O_2$. This may also reduce possible cross-over of gasses. The battolyser especially needs to combine the current storage density of the Ni—Fe battery ($mAh/cm^3$), with the current density of the alkaline electrolyser ($mA/cm^2$ on the electrode and diaphragm surface).

The charge storage density is determined by the density of the materials. The energy density also depends on the potential difference of the reactions taking place at the negative and positive electrodes:

Negative electrode: $Fe(OH)_2 + 2e^- \rightarrow Fe + 2OH^-$
(−0.877V vs SHE) [1]

Positive electrode: $Ni(OH)_2 + OH^- \rightarrow NiOOH + H_2O + e^-$
(+0.49V vs SHE) [2]

Open circuit potential=0.49+0.877=1.37V.

Below the table indicates charge storage densities as resulting from the battery chemical reactions. In the table β-$Ni(OH)_2$ is indicated, which is the thermodynamically most stable form of nickel hydroxide. Another structure, α-$Ni(OH)_2$, can also be formed (partially) during electrochemical cycling. This has a lower density and needs some space for expansion (the porosity of practical electrodes makes that possible). The thickness of the electrodes in the direction perpendicular to the separator determines the current density per electrode surface unit (in $A/cm^2$) that is required to (dis-)charge the battery electrode capacity per electrode surface unit (in $Ah/cm^2$) in a certain time.

|  | $Fe(OH)_2$ | β-$Ni(OH)_2$ |
|---|---|---|
| Density [$g/cm^3$] | 3.4 | 4.10 |
| Molar mass [g/mol] | 89.8597 | 92.708 |
| Charge storage density [$C/cm^3$] | 7298 | 4268 |
| Charge storage density [$Ah/cm^3$] | 2.027 | 1.186 |
| Minimal electrode thickness* at 0.8 $Ah/cm^2$: [cm] | 0.40 | 0.68 |
| Practical electrode thickness** at 0.8 $Ah/cm^2$: [cm] | 1.1 | 1.8 |
| Minimal electrode thickness*** at Z $Ah/cm^2$: [cm] | 0.40 (Z/0.8) | 0.68 (Z/0.8) |
| Practical electrode thickness at Z $Ah/cm^2$: [cm] | 1.1 (Z/0.8) | 1.8 (Z/0.8) |

*800 $maH/cm^2$ of the electrode surface both satisfies battery needs (a chosen capacity of 2 h charge with maximal current density of 400 $mA/cm^2$) and electrolysis needs (400 $mA/cm^2$ continuous, the state of the art for alkaline electrolysers). In a solar powered future on average 1-2 h peak electricity storage in the battery is required plus 2-3 times longer electrolysis at peak power in summer (3-8 h charge insertion in total at day time). Discharge at night could be done at lower rates e.g. in 6-8 h.
**Literature electrode densities in practice: 37%, i.e. less than theoretical maximum, so the electrodes are porous and would become thicker accordingly. Thickness for 'old Edison battery' electrodes: 6 mm = 0.6 cm. The porosity can vary.
***The value Z indicates an arbitrary charge capacity in [Ah]. The equation relates thickness of electrode. Z can range from 0.01 (10 mAh very thin battery electrode) to 4 (4000 mAh very thick), and can have a larger value for the Fe than for the Ni electrode as discussed previously.

Energy storage density [$Wh/cm^3$] of a basic anode-cathode-electrolyte configuration: this is the product of the charge storage densities times the potential between the electrodes. At OCV the 'single cell battery energy density' would be ~1.37V×0.8 Ah/(1.1+1.8+0.3 $cm^3$)=0.343 $Wh/cm^3$=343 Wh/L. The (1.1+1.8+0.3 $cm^3$) is the sum of practical anode, cathode and some electrolyte plus diaphragm thicknesses. Note: this is a very high volumetric energy density for any battery, thanks to the high volumetric storage capacity of alkaline batteries and the Fe and Ni electrodes in particular.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An energy apparatus having an electrical energy storage functionality and an electrolysis functionality, the system comprising a functional unit, the functional unit comprising:
    a first cell, comprising a first cell electrode and one or more first cell openings for a first cell aqueous liquid and for a first cell gas, wherein the first electrode comprises an iron based electrode;
    a second cell, comprising a second cell electrode and one or more second cell openings for a second cell aqueous liquid and for a second cell gas, wherein the second electrode comprises a nickel based electrode;
    a separator, wherein the first cell and the second cell share the separator, wherein the separator is configured to block transport of one or more of $O_2$ and $H_2$ from one cell to another while having permeability for at least one or more of hydroxide ions ($OH^-$) monovalent sodium ($Na^+$), monovalent lithium ($Li^+$) and monovalent potassium ($K^+$);
    a first electrical connection in electrical connection with the first cell electrode, and a second electrical connection in electrical connection with the second cell electrode;
    the energy apparatus further comprising:
    an aqueous liquid control system configured to control introduction of one or more of the first cell aqueous liquid and the second cell aqueous liquid into the functional unit;
    a storage system configured to store one or more of the first cell gas and the second cell gas external from said functional unit;
    a pressure system configured to control one or more of (a) the pressure of the first cell gas in the functional unit, (b) the pressure of the first cell gas in the storage system, (c) the pressure of the second cell gas in the functional unit, and (d) the pressure of the second cell gas in the storage system;
    a charge control unit configured to receive electrical power from an external electrical power source and configured to provide said electrical power to said functional unit during at least part of a charging time at a potential difference between the first cell electrode and the second cell electrode of more than 1.37 V;
    a first connector unit for functionally coupling to a receiver to be electrically powered and the electrical connection, and a second connector unit for functionally connecting a device to be provided with one or more of the first cell gas and the second cell gas with said storage system; and
    a control system configured to control the aqueous liquid control system, the storage system, the pressure system, and the charge control unit.

2. The energy apparatus according to claim 1, wherein the first electrode has first capacity and wherein the second electrode has a second capacity, wherein the second capacity is less than 90% of the first capacity.

3. The energy apparatus according to claim 1, wherein the charge control unit configured to provide said electrical power to said functional unit during at least part of a charging time at a potential difference between the first cell electrode and the second cell electrode selected from the range of 1.6-2.0 V and at a current density selected from the range of 0.001-10 A/cm$^2$.

4. The energy apparatus according to claim 1, wherein the control system is configured to control the charge control unit as function of a charge status of the functional unit and an availability of electrical power from the external electrical power source.

5. The energy apparatus according to claim 1, comprising a plurality of functional units, wherein two or more of the functional units are arranged in series and/or wherein two or more of the functional units are arranged parallel.

6. An energy system comprising the energy apparatus according to claim 1 and an external power source.

7. The energy system according to claim 6, wherein the external power source comprises one or more of a photovoltaic cell, a wind turbine, and a water turbine.

8. The energy system according to claim 6, comprising a plurality of energy apparatus and a plurality of external power sources and an electricity grid.

9. The energy system according to claim 8, wherein the energy apparatus are arranged remote from each other along highways and roads.

10. A method of storing electrical energy and one or more of hydrogen ($H_2$) and oxygen ($O_2$) with the energy apparatus according to claim 1, the method comprising: providing the first cell aqueous liquid, the second cell aqueous liquid, and electrical power from an external power source to the functional unit thereby providing an electrically charged functional unit and one or more of hydrogen ($H_2$) and oxygen ($O_2$) stored in said storage system, wherein during at least part of a charging time the functional unit is charged at a potential difference between the first cell electrode and the second cell electrode of more than 1.37 V.

11. The method according to claim 10, wherein during at least part of a charging time at a potential difference between the first cell electrode and the second cell electrode is selected from the range of 1.6-2.0 V.

12. The method according to claim 10, comprising maintaining a first pressure in the first cell and a second pressure in the second cell at a pressure of at least 30 bar.

13. The method according to any claim 10, comprising maintaining a first pressure in the first cell and a second pressure in the second cell at a pressure of at least 150 bar.

14. A method comprising using an energy apparatus according to claim 1 wherein using the energy apparatus includes providing one or more of electrical power, hydrogen ($H_2$) and oxygen ($O_2$) to a receiver.

15. The method according to claim 14, comprising providing one or more of electrical power, hydrogen ($H_2$) to a motorized vehicle having an engine deriving its propulsion energy from one or more of a hydrogen source and an electrical power source.

16. The method according to claim 14, comprising using a device comprised by an industrial object that is configured to utilize one or more of electrical power, hydrogen and oxygen.

17. A method comprising using an energy system according to claim 6 wherein using the energy system includes providing one or more of electrical power, hydrogen ($H_2$) and oxygen ($O_2$) to a receiver.

18. The method according to claim 17, comprising providing one or more of electrical power, hydrogen ($H_2$) to a motorized vehicle having an engine deriving its propulsion energy from one or more of a hydrogen source and an electrical power source.

19. The method according to claim 17, comprising using a device comprised by an industrial object that is configured to utilize one or more of electrical power, hydrogen and oxygen.

* * * * *